United States Patent
Wang et al.

(10) Patent No.: US 9,028,155 B2
(45) Date of Patent: May 12, 2015

(54) LATCHABLE MODULE HOUSINGS AND METHODS OF MAKING AND USING THE SAME

(75) Inventors: Zili Wang, Chengdu (CN); Wayne Wainwright, Ventura, CA (US); Mark Heimbuch, West Hills, CA (US)

(73) Assignee: Source Photonics, Inc., Chatsworth, CA (US)

( * ) Notice: Subject to any disclaimer, the term of this patent is extended or adjusted under 35 U.S.C. 154(b) by 312 days.

(21) Appl. No.: 13/563,682

(22) Filed: Jul. 31, 2012

(65) Prior Publication Data

US 2013/0322832 A1    Dec. 5, 2013

(30) Foreign Application Priority Data

May 31, 2012    (CN) .......................... 2012 1 0175558

(51) Int. Cl.
*G02B 6/36*    (2006.01)
*G02B 6/42*    (2006.01)

(52) U.S. Cl.
CPC ......... *G02B 6/4261* (2013.01); *Y10T 29/49826* (2015.01); *G02B 6/4284* (2013.01)

(58) Field of Classification Search
None
See application file for complete search history.

(56) References Cited

U.S. PATENT DOCUMENTS

| | | | |
|---|---|---|---|
| 5,901,263 A * | 5/1999 | Gaio et al. ...................... | 385/92 |
| 6,789,958 B2 | 9/2004 | Ahrens et al. | |
| 6,830,385 B2 * | 12/2004 | Ishigami et al. ................ | 385/92 |
| 6,851,867 B2 | 2/2005 | Pang et al. | |
| 6,855,558 B1 * | 2/2005 | Hattori .......................... | 436/160 |
| 6,872,010 B1 | 3/2005 | Bianchini | |
| 6,887,092 B2 * | 5/2005 | Minota .......................... | 439/372 |
| 7,186,134 B2 * | 3/2007 | Togami et al. ................. | 439/484 |
| 7,281,863 B2 * | 10/2007 | Yamada et al. ................. | 385/92 |
| 7,347,711 B1 | 3/2008 | Bianchini et al. | |

(Continued)

FOREIGN PATENT DOCUMENTS

| | | |
|---|---|---|
| CN | 101819303 A | 9/2010 |
| CN | 102681110 A | 9/2012 |

OTHER PUBLICATIONS

Rixin Li, Zhen Peng, Longkun Wang and Miaoqing Wang; "SFP (Small Form-Factor Pluggables) Optical Module Unlocking Device and SFP Optical Module Adopting Same"; espacenet—Bibliographic data; Chinese Publication No. CN101819303 (A); Publication Date: Sep. 1, 2010; Worldwide Database, http://worldwide.espacenet.com/publicationDetails/biblio?CC=CN&NR=101819303A&K . . . .

(Continued)

*Primary Examiner* — Tina Wong
(74) *Attorney, Agent, or Firm* — Andrew D. Fortney; Central California IP Group, P.C.

(57) ABSTRACT

An optical module housing that may be easily seated, locked in and removed from a socket, thereby reducing or eliminating potential damage to the module and socket, and methods for making and using the housing are disclosed. The module housing generally includes a chassis, one or more pivots attached to the chassis, a latch configured to secure the housing in a corresponding slot when in a locked position, a slider configured to be in contact with and/or connected to the latch and to move the latch relative to the chassis, the latch and/or the slider being configured to move on and/or around the pivot(s) and a handle configured to be in contact with and/or connected to the slider such that when the handle moves from a first position to a second position, the slider and latch move to the locked and/or an unlocked positions.

26 Claims, 17 Drawing Sheets

(56) References Cited

U.S. PATENT DOCUMENTS

| | | | |
|---|---|---|---|
| 7,841,779 | B1 | 11/2010 | Bianchini et al. |
| 8,040,687 | B2 * | 10/2011 | Pirillis .......................... 361/801 |
| 2003/0044129 | A1 * | 3/2003 | Ahrens et al. .................... 385/92 |
| 2005/0148223 | A1 | 7/2005 | Shirk et al. |
| 2005/0226587 | A1 * | 10/2005 | Minota et al. ................. 385/134 |
| 2008/0031577 | A1 * | 2/2008 | Walker et al. ................... 385/92 |
| 2008/0089649 | A1 | 4/2008 | Wang |
| 2010/0046954 | A1 | 2/2010 | Liu et al. |
| 2010/0067199 | A1 | 3/2010 | Chen |
| 2010/0142898 | A1 | 6/2010 | Teo et al. |

OTHER PUBLICATIONS

"Optical Transceiver"; Adamant; 2011; Adamant Kogyo Co.

SFP Insertion and Seating Field Notice; Champion ONE; 2009; 4 pgs.; Champion ONE, Beachwood, OH; US.

"Cisco Small Form-Factor Pluggable (SFP) Transceiver Modules Maintenance and Troubleshooting"; Cisco CWDM GBIC/SFP; 2008; Document ID No. 72370; 24 pgs.

"Installing SFP Modules in Cisco 3800 Series Routers"; Cisco 3800 Series Hardware Installation; 3 pgs.

"100BASE-FX Spring-Latch SGMII SFP Transceiver"; Fiberxon; Nov. 13, 2006; 10 pgs.; Fiberxon, Santa Clara, CA; US.

"Release Mechanisms Product Data Sheet"; Fourte Fiber Optics; 9 pgs.; FDD—Level 4.6 Product Data Sheet Release Mechanisms—Rev 02.

"SFP Form Factor Product Data Sheet"; Fourte Fiber Optics; 4 pgs.; FDD—4.1 Product Data Sheet SFP Form Factor—Rev 01.

"H3C Low End Series Ethernet Switches Pluggable Modules Manual-(V1.02)"; H3C Technical Support & Documents; 16 pgs.; 2007-2009; Hangzhou H3C Technologies Co., Ltd.

"Install and Remove SFP Transceiver Modules"; Cisco SFP Transceiver Modules.

\* cited by examiner (Background)

(Background)

LATCHABLE MODULE HOUSINGS AND METHODS OF MAKING AND USING THE SAME

RELATED APPLICATION

This application claims the benefit of Chinese Patent Application No. 201210175558.4, filed on May 31, 2012, which is incorporated herein by reference in its entirety.

FIELD OF THE INVENTION

The present invention generally relates to the field of optical modules (e.g., transmitters, receivers, transceivers and/or transponders, etc.) and housings therefor. More specifically, embodiments of the present invention pertain to module housings (such as for a SFP optical transceiver) that are easily and securely locked into sockets or cages configured to accept such module housings, release mechanisms for such module housings, and methods of making and using the same.

DISCUSSION OF THE BACKGROUND

Optical modules are used for transmitting optical signals over fibers in optical fiber networks. Common types of optical modules include transmitter modules, receiver modules, transceiver modules and transponder modules. Optical transceivers transform optical signals to electrical signals or electrical signals to optical signals. Optical transceivers may comprise photoelectrical devices, functional circuits, optical interfaces, etc., which play important roles in fiber optical communication systems. Depending on the design of the optical module housing, transceivers may be small form pluggable (SFP), gigabit interface converter (GBIC), protocol independent small form factor pluggable (XFP), etc. SFP optical transceivers, which function similarly to GBIC modules, are half the size of GBIC modules and may have more than twice the number of interfaces as GBIC modules. Many optical modules, including SFP optical transceivers, are "hot-pluggable" devices, in that they allow the user to insert and remove the module without significant interruption to the operation of the system. Such pluggable modules install into sockets or cages and may be locked into, and unlocked from the sockets or cages utilizing one of a variety of types of latch/release mechanisms.

The dimensions, arrangements, communications ports (e.g., input and/or output pins) and/or footprints of the optical modules and their housings are typically defined both by industry standards and a Multi-Source Agreement ("MSA") among manufacturers of such modules. The MSA specifies the mechanical dimensions and opto-electrical characteristics of the module and its housing, but allows for variations in module and housing design. The differences in design may lead to differences in the deployment and installation of the module. Most notably, the latch/release mechanisms may vary from manufacturer to manufacturer. Some conventional mechanisms comprise a tapered end or projection that may be deployed or retracted through a lock hole or slot in the module housing. When a module housing is inserted into a socket, the tapered end or projection is deployed such that it protrudes through the lock hole or slot in the casing or the module housing and engages the socket to latch or lock the module in place. To remove the module housing from the socket, the tapered end or projection is retracted into the lock hole or slot to unlatch or unlock the module housing and disengage it from the socket.

Optical modules and housings with conventional latch/release mechanisms can also include Mylar tab latches, actuator button latches and bale-clasp latches. Conventional latch/release mechanisms are configured to work on a lever principal. Specifically, the tapered end or projection is on one end of the lever, and the other end of the lever is connected to the tab, actuator button or bale-clasp. When releasing or unlocking the module, the tapered end or projection is disengaged from the socket by lifting the tab, the actuator or the bale-clasp to move the tapered end or projection down and into the module housing. The module housing may then be removed from the socket by applying a force along the module housing thereby pulling the module housing out of the socket. However, removing the module housing when the lever is not in the proper position can damage the tapered end or projection and/or the socket or cage.

FIGS. 1-2 show a conventional module housing 100 with a bale-clasp latch. Referring initially to FIG. 1, the module housing 100 includes a module base or chassis 109, a bale or handle 113, and a single piece latch/slider 105 with a projection 104 that locks the module housing 100 into a corresponding socket (not shown). In FIG. 1, the bale 113 is shown in the lowered position and the latch/slider 105 in the locked position. When the bale 113 is moved from a lowered position to a raised position, the latch/slider 105 and the projection 104 move down into the chassis 109 (the "unlocked" position). When the bale 113 is moved from a raised position to a lowered position, the latch/slider 105 and the projection 104 move up and out of the chassis 109 (the "locked" position). As shown in FIG. 1, the bale 113 is attached to the chassis 109 by shafts or pins 150.

FIG. 2 shows the exemplary module housing 100 of FIG. 1 with the bale 113 in a raised position, and the latch/slider 105 and the first projection 104 in the unlocked position. In the raised position, the bale 113 is at an angle of 90 degrees from the lowered position, and the far end of the latch/slider 105 is lowered such that the first projection 104 is flush with or below the surface of the chassis 109. As sown in FIG. 2, the bale 113 is attached to the latch/slider by slider pins 156.

To operate the conventional release mechanisms described above, a force must first be applied to the latch/slider to lock or unlock the module housing and then a second force must be applied parallel to the module housing to insert or remove the module housing from the socket. If the force applied first does not completely lock or unlock the module housing prior to the second force being applied, the latch, the projection and/or the socket may be damaged. Consequently, conventional latches may be difficult to properly seat, lock in place and/or remove.

For example, when inserting a module with a conventional latch into a socket, in order to verify that the module is properly seated, it is generally recommended that the user verifies both audibly and visually that the module is locked into position. Visual-only inspection can produce intermittent and/or total loss of functionality and/or conductivity because vibrations, connecting cable movement and/or temperature changes may result in unseating of the module if it is not fully locked into position. Likewise, audible-only verification may result in faulty seating because some modules will emit an audible "click" once seated, while others will click upon actuation of the latching mechanism, but will still require additional force to properly seat the housing. In fact, because of the shortcomings of the methods of verifying that the module is securely locked into place, one should mechanically verify that the module is locked into place after communication cables, wires or fibers are installed. Mechanical verification is performed by applying an outward force to the cable, wire or fiber. If the module is not properly seated and locked, the module will come out of the socket.

Generally, and regardless of type of conventional latch, mechanical verification is a relatively time-consuming and cumbersome process, particularly when many modules require installation in a short period of time. Therefore, mechanical verification is a step that may often be skipped by users when inserting such modules. Consequently, modules may be improperly installed, may have only intermittent functionality, or may lose functionality entirely, causing interruption and/or failure of the device in which such modules are installed. Additionally, removal of optical modules from the corresponding sockets may be difficult without causing damage to the latch and/or the module. For example, to remove a module having a Mylar tab latch from a socket, the user gently pulls the tab in a slightly downward direction until the module disengages from the socket. If the Mylar tab is pulled too vigorously and/or twisted, the tab can detach from the module thereby causing failure of the mechanism. If the latch/slider is not in the proper position when the module is removed, the tapered end or projection and/or the socket may be damaged.

Chinese Patent Application No. 201010153763.1 discloses a device capable of releasing a SFP optical transceiver by applying a force to rotate a bale or handle and then applying a second force along the optical transceiver to remove the transceiver from the socket. A locking plate on the top of the casing or housing of an optical transceiver, and a lock hole or slot in the locking plate, are operated by an arc unlocking unit with an arc-shaped unlocking sliding piece and unlocking spring pieces, which are configured to lift the lock plate up and release the tapered end or projection from the lock hole. Specifically, when the bale or handle rotates, the arc unlocking unit lifts the locking plate end to the height of the tapered end or projection, thereby releasing the optical transceiver from the socket. The optical transceiver may then be removed from the socket by applying a second force along the optical receiver. However, this release mechanism requires bending of the locking plate and/or the slider to unlock the optical transceiver, thus requiring a relatively high releasing force. Such operation is inconvenient and places repeated high bending stress on the locking plate and/or the slider. Other conventional module latches may have similar disadvantages when removing a module from a socket.

Therefore, a need exists for a module housing that is easily seated, securely locked into position, and inserted and removed with minimal force and/or damage to the latch, module or socket.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention generally pertain to optical modules having a housing that is easily seated in a socket configured to accept such housing, securely locked in the socket, and capable of being inserted and removed with minimal force and chance of damage to the housing and/or its locking mechanism. Embodiments of the present invention also relate to methods of making and using such securely-locked, easily-inserted and removable module housings.

In one aspect, the present invention may include a module housing, generally comprising (a) a chassis, (b) one or more pivots attached to the chassis, (c) a latch configured to secure the chassis and/or housing in a complementary and/or corresponding slot when in a locked position, (d) a slider configured to be in contact with and/or connected to the latch and to move the latch relative to the chassis, the latch and/or the slider configured to move on and/or around the pivot(s), and (e) a handle configured to be in contact with and/or connected to the slider such that when the handle moves from a first position to a second position, the slider and the latch move to one of the locked position and an unlocked position. Because the latch and/or the slider move on or around the pivot(s) attached to the chassis of the module housing, and the handle in positive contact with and/or connected to the slider and/or the latch, the latch is more reliably moved between the unlocked and locked positions.

According to one embodiment of the present invention, the handle may be fixedly attached to the slider and configured such that a force applied substantially parallel to a planar surface of the slider moves the handle from the first position to the second position or from the second position to the first position, without the need to apply a force along another axis or plane, thereby easily and securely locking the module housing in the complementary or corresponding socket or easily unlocking the module from the slot so that the module housing may removed with little or no risk of damage to the module housing or to the socket.

According to another embodiment of the present invention, the handle may comprise one or more teeth, and the slider may comprise one or more slots, the teeth configured to mesh and/or mate with the slot(s) such that the latch and the slider move to the unlocked position or the locked position when the handle moves from a first position to a second position. In such embodiment, the handle may be rotatably attached to chassis and configured such that the first position of the handle may be approximately 90 degrees from the second position of the handle. The teeth provide for positive engagement of the slider when the handle is moved from one position to the other, thereby insuring that the module housing is securely locked into place and is unlocked for easy removal, without the need to apply excessive force to the handle and/or the module housing.

According to another embodiment of the present invention, the module housing may include two pivots, one on each side of a unitary latch/slider comprising slider pins configured to move on and/or around the pivots. A unitary latch/slider ensures proper deployment of the latch when the slider is moved.

In yet another aspect of the present invention, an SFP optical transceiver may comprises an optical interface, an electrical interface and a release mechanism. An upper surface of the optical transceiver has a lock hole and a movable pressure bar thereunder. The optical transceiver also has a tapered end, which can protrude from the upper surface of the optical transceiver via the lock hole. The optical transceiver further has an internally spliced tumbler (or latch arm) on which the tapered end is mounted. An elastic reset device (e.g., a lever or a spring) is mounted between the tumbler and the transceiver. In addition, one side of the tapered end close to the electrical interface has an inclined plane below the pressure bar. In operation, the pressure bar contacts the inclined plane and pushes the tapered end into the optical transceiver via the inclined plane. This aspect of the present invention is intended to overcome high de-latching resistance and low de-latching efficiency in conventional devices, and further provides a release mechanism for an SFP optical transceiver with convenient use and low driving force.

In operation, a release force is applied to the pressure bar, moving the pressure bar translationally below the lock hole, such that the pressure bar contacts the inclined plane, and transfers the release force to the tapered end (e.g., a latch) to drive the tumbler (latch arm). Thus, de-latching can be completed by rotating the protruding tapered end and the tumbler such that the tapered end recedes into the optical transceiver.

Preferably, the elastic reset device can be a foldable part (e.g., a lever) mounted on the optical transceiver. When de-latching, the lever contacts the tumbler by pressure. The punched and bent face of the casing of the optical transceiver can be used as the elastic reset device, which is characterized by high elasticity, simple structure, smaller space and advantageous use of internal space for other components of the optical transceiver.

Preferably, in order to reset the tapered end position while keeping the tumbler level, the middle part of the tumbler contacts a support structure (e.g., a pivot) in the optical transceiver, the tapered end being on one end of the tumbler, and the other end connected to an elastic reset device. In this structure, after the tapered end goes into the optical transceiver during de-latching, the other end of the tumbler tilts such that the elastic reset device can drive the tapered end to return to a protruding position from the optical transceiver via a lever.

Preferably, the pressure bar has a feature that matches up the wall of the lock hole close to the optical interface and secures the tapered end by clamping during de-latching. In this structure, the pressure bar can force the tapered end through the lock hole for unlocking via the inclined plane, and then the pressure bar can continue to move towards the optical interface such that the pressure bar feature clamps to a wall (or opening thereon) of or near the lock hole close to the optical interface. Thus, the optical transceiver can be pulled out smoothly, quickly and easily from the case along a central axis by de-latching (i.e., during the unlocking process).

Preferably, the optical transceiver is spliced with (e.g., includes) the tumbler via an arc wall (or pivot surface) and spindle (or pivot). Specifically, the optical transceiver has a spindle inside, and the bottom of the tumbler has an arc wall having a snug fit with the surface of the spindle. This structure has the advantage of being simple and convenient for assembly.

Preferably, the optical transceiver comprises a module base and a casing mounted on the module base. The uppermost surface of the casing has a lock hole. The foldable part or lever is formed by bending the casing upwards. This structure has the advantage that it is convenient for processing and makes efficient use of the inner space of the optical transceiver.

Preferably, a pulling plate fixed, attached or integral to the pressure bar is between the module base and the casing. The upper surface of the module base has a sliding chute that mates or snugly fits with the pulling plate. By sliding the pulling plate mounted on or mated with the sliding chute, the release slide can be driven translationally, which helps to guide the movement of the pressure bar. Preferably, the side of the pulling plate closest to the optical interface is attached to a draw bar. In this structure, it is easy to pull the pulling plate out from the optical interface side of the optical transceiver and drive the pressure bar to enable de-latching. Preferably, the pulling plate has a run-through slot accommodating the tumbler, which can prevent the tumbler rotation from disturbing the pulling plate.

Preferably, the pulling plate has a lug which can match or mate with a first block relatively near the optical interface (e.g., by clamping). In this structure, after pulling the pulling plate to enable de-latching, the lug matching the first block makes it easy for operation (e.g., so that the optical transceiver can be pulled out from the cage while de-latching). Preferably, the lug is located between the first block and a second block on the side of the sliding chute relative (e.g., closer) to the electrical interface. Preferably, the lugs flank the pulling plate.

Relative to existing technologies, this aspect of the present invention has advantages in that (1) it only needs pressure applied to the inclined plane to drive the tumbler downwards during operation; (2) the release mechanism is characterized by low resistance during release operations and is convenient for operations; and (3) the operation is so simple, efficient and convenient that the optical transceiver can be released via drawing the draw bar without necessarily turning the draw bar to a 90° angle.

Another aspect of the present invention relates to a method of locking a module in a socket configured to accept the module, generally comprising (a) moving a handle from a first position to a second position such that a slider operably connected to the handle and a latch operably connected to the slider move from a locked position to an unlocked position, wherein the latch and/or the slider are configured to move on and/or around a pivot, (b) inserting the module into the socket until the latch is in the socket, and (c) moving the handle from the second position to the first position such that the latch moves from the unlocked position to the locked position.

A further aspect of the present invention relates to a method of manufacturing a module housing, generally comprising (a) operably connecting a slider to a latch, wherein the slider is configured to move the latch relative to a chassis in the module housing, (b) operably connecting the latch and/or the slider to one or more pivots in the chassis, wherein the latch and/or the slider are/is configured to move on and/or around the pivot, and (c) attaching a handle to the slider, wherein the handle is configured to move from a first position to a second position such that the latch moves from a locked to an unlocked position, or from the unlocked position to the locked position, in response to movement of the slider and/or the handle.

The present module housings and methods of manufacturing and using such module housings advantageously provide housings which may be easily seated, securely and reliably locked in a corresponding and/or complementary module socket, and inserted and removed from the module socket with minimal force.

Various embodiments and/or examples disclosed herein may be combined with other embodiments and/or examples, as long as such a combination is not explicitly disclosed herein as being unfavorable, undesirable or disadvantageous. These and other advantages of the present invention will become readily apparent from the detailed description of various embodiments below.

Figure 1:
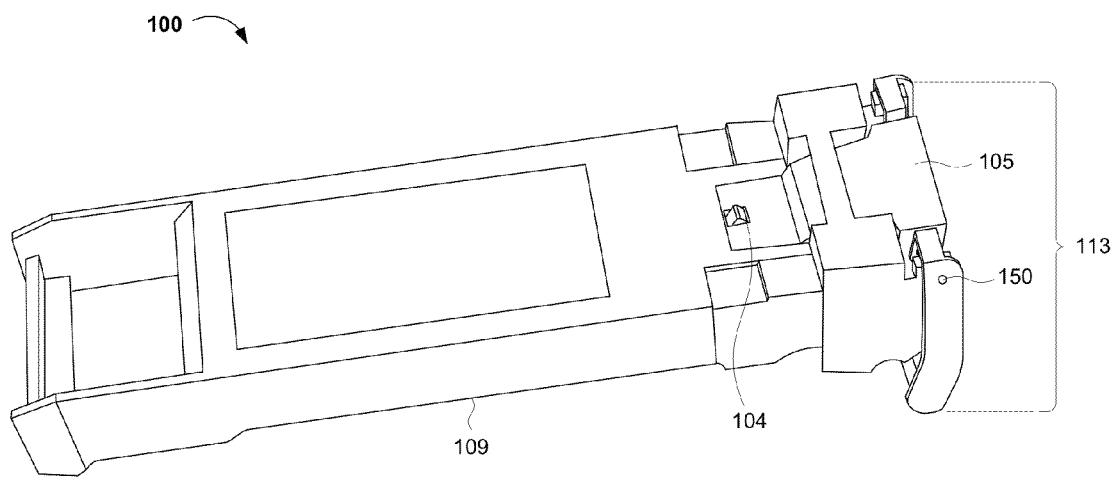
FIG. 1 is a perspective view of a conventional module housing with a handle in the lowered position and a latch in the locked position.
Figure 2:
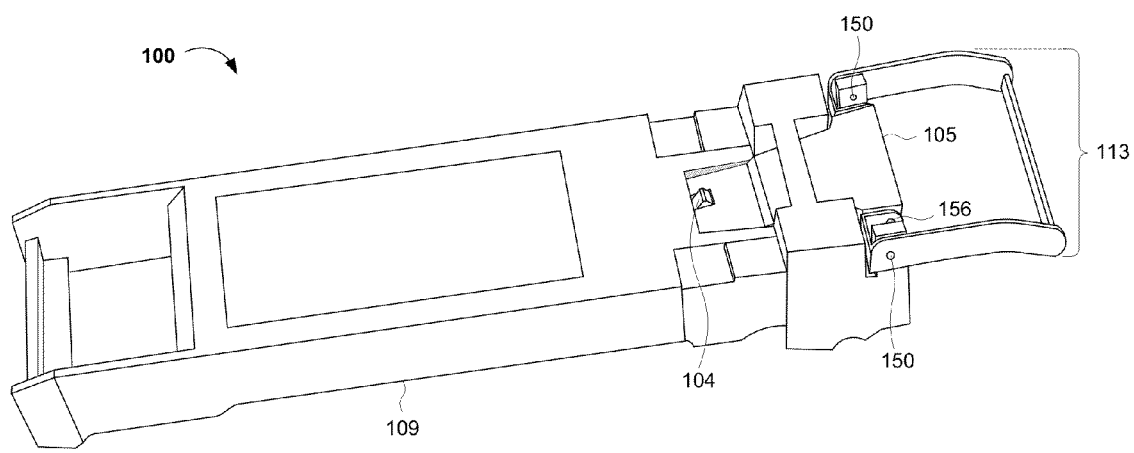
FIG. 2 is a perspective view of the conventional module housing of FIG. 1, showing the handle in the raised position and the latch in the unlocked position.

The following labels are included in FIGS. 3-11: optical interface—201; electrical interface—202; lock hole—203; tapered end—204; inclined plane—204a; tumbler—205; arc wall—205a; release slider—206; foldable part—207; spindle—208; module base—209; casing—210; sliding chute 211; pulling plate—212; lug—212a; run-through slot—12b; draw bar—213; first block 214; and second block—215.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Furthermore, all characteristics, measures or processes disclosed in this document, except characteristics and/or processes that are mutually exclusive, can be combined in any manner and in any combination possible. Any characteristic disclosed in the present specification, Claims, Abstract and Figures can be replaced by other equivalent characteristics or characteristics with similar objectives, purposes and/or functions, unless specified otherwise. Each characteristic is generally only an embodiment of the invention disclosed herein.

For the sake of convenience and simplicity, the terms "socket," "slot," "port" and "port socket" are generally used interchangeably herein, unless the context of the use indicates otherwise, but are generally given their art-recognized meanings. Also, for convenience and simplicity, the terms "attached," "connected to," "coupled with," "coupled to," and "in communication with" (which terms also refer to direct and/or indirect relationships between the connected, coupled and/or communicating elements unless the context of the term's use unambiguously indicates otherwise), may be used interchangeably, as may the terms "hole," "cutout," "space," "lock hole" and "slot," the terms "shaft" and "pin," but these terms are also generally given their art-recognized meanings. Further, and also for convenience and simplicity, the terms "module base" and "chassis," the terms "bale," "bale-clasp" and "handle," the terms "tumbler" and "latch," the terms "spindle" and "pivot," and the terms "pulling plate" and "slider" may be used interchangeably, but these terms are also generally given their art-recognized meanings.

Embodiments of the present invention advantageously provide a module housing that is easily seated in a socket, securely locked in the socket, and inserted and removed with minimal force and potential damage to the module, module housing and/or the latch. According to various embodiments of the present invention, the latch and/or the slider move on or around one or more pivots attached to a chassis of the module housing, thereby providing reliable movement and/or rotation of the latch from an unlocked position to a locked position and from the locked position to the unlocked position.

Embodiments of the present invention also pertain a method of inserting a module housing into a corresponding and/or complementary socket, wherein the module housing comprises a latch and/or a slider that moves on and/or around a pivot and a handle attached and/or operably connected to the slider. Further embodiments of the present invention relate to a method of making and using the module housing.

The invention, in its various aspects, will be explained in greater detail below with regard to exemplary embodiments. The technical proposal of embodiments of the present invention will be fully and clearly described in conjunction with the drawings in the following embodiments, but it will be understood that the descriptions are not intended to limit the invention to these embodiments.

Exemplary Module Housings and Latches

In one aspect, the present invention relates to latchable module housings and release mechanisms for latchable module housings (e.g., optical transceivers). FIGS. 3-11 show a first exemplary module housing 200 and release mechanism, generally comprising (a) an optical interface 201, (b) an electrical interface 202, (c) a lock hole or slot 203 in the top of the module housing 200 having a movable release slider or pressure bar 206 inside, (d) a tapered end 204 which can protrude from the top of the module housing 200 via the lock hole 203, (e) an internally spliced tumbler or latch 205 on which the tapered end 204 is mounted, (f) an elastic reset device, mounted between the latch or tumbler 205 and the module housing 200, (g) an inclined plane 204*a* on one side of the tapered end 204 close to the electrical interface 202. To release the module housing 200 from a corresponding socket or cage (not shown), the pressure bar contacts the inclined plane 204*a* and pushes the tapered end 204 into the module housing 200 via the inclined plane 204*a* (the "unlocked" position; see FIG. 5).

In some embodiments, the elastic reset device is or comprises a folded or foldable part of the housing (see, e.g., tab 207 in FIG. 6), configured to connect to and press against the latch or tumbler 205 when the release mechanism is in the unlocked position. In some embodiments, the pressure bar 206 contacts, mates with and/or engages the end of the lock hole 203 closest to the optical interface 201. In some instances, the module housing 200 includes a spindle or pivot (see, e.g., 208 in FIG. 10) that supports the latch or tumbler 205, and particularly an arc wall 205*a* at a bottom surface of the latch or tumbler 205 (see FIGS. 6, 9-10). The arc wall 205*a* may mate with or otherwise have a tight fit with the shaft or spindle 208. In some instances, the optical transceiver may comprise a module base or chassis 209 and a cover or casing 210 mounted on the chassis or module base 209, the lock hole 203 may be located in the uppermost surface of the casing 210, and/or the foldable part or tab 207 is made by folding the casing 210 upwards (e.g., away from the module housing 200).

In some embodiments, the release mechanism comprises a pulling plate or slider (see, e.g., the plate or slider 212 in FIGS. 6-8) mounted between the module base or chassis 209 and the casing 210, a sliding chute (see, e.g., sliding chute 211 in FIGS. 6-7) on the top surface of the module base 209, where the bottom surface of the pulling plate or slider 212 may be mated with or have a tight fit with the top surface of the sliding chute 211. In one embodiment, a draw bar or handle 213 is connected to one side of the pulling plate or slider 212, close to or at the optical interface 201. In some implementations, the pulling plate or slider 212 has a run-through or elongated slot 212*b*, accommodating the latch or tumbler 205. The pulling plate or slider 212 may further comprise lugs 212*a*, where the surface closest to the optical interface 201 may contact, mate with and/or engage a first block (see, e.g., blocks 214 in FIGS. 6-8) adjacent to or defining the sliding chute 211. Further, in some implementations, the end of the sliding chute 211 closest to the electrical interface 202 may be defined by a second block 215, and the lug 212*a* moves longitudinally between the first block 214 and the second block 215. Additionally, the lugs 212*a* may be symmetrical on both sides of the pulling plate or slider 212. Details of this first exemplary embodiment are further explained below.

Figure 3:
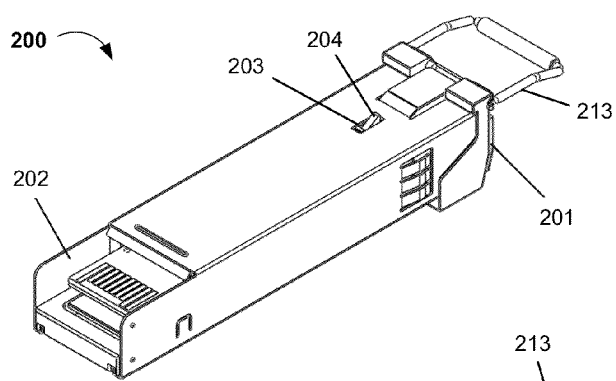
FIG. 3 is a diagram showing a first exemplary embodiment of a module housing, showing an optical interface and an electrical interface.

Referring to FIG. 3, the latchable module housing 200 comprises an optical interface 201 and an electrical interface 202. The latchable module housing 200 may be inserted into a complementary or corresponding socket or cage (not shown in the figures) by inserting the end of the housing 200 comprising the electrical interface 202 into the socket. The housing 200 may be released from the socket by an exemplary release mechanism from the end of the module housing 200 comprising the optical interface 201.

Figure 4:
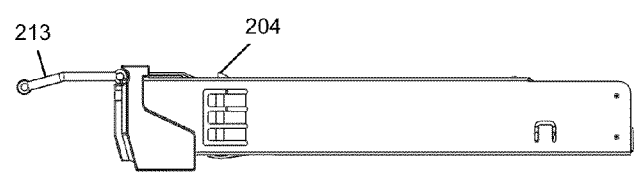
FIG. 4 is a side view of the exemplary module housing of FIG. 3, showing a handle and a first projection in a locked position.
Figure 5:
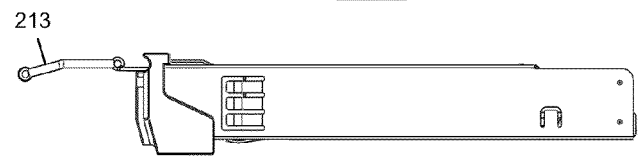
FIG. 5 is a side view of the exemplary module housing of FIG. 3, showing the handle and the first projection in an unlocked position (the first projection is below the top surface of the module housing, and thus, is not visible).

The status of locking and unlocking the optical module housing 200 in a cage or socket is shown in FIGS. 4-5. When the module housing is locked in a cage (e.g., in a switchboard), a tapered end or first projection 204 of the latch 205 (FIG. 6) protrudes through a top surface of the module housing 200 from the inside though lock hole or slot 203 (the "locked position"; see FIG. 4), and clamps or engages the cage, thereby locking the module housing 200 in the cage. When the module housing 200 is released from the cage, the tapered end or first projection 204 retracts through lock hole 203 and returns into the module housing 200 (the "unlocked" position; see FIG. 5), removing the clamping connection or disengaging the tapered end 204 from the cage, such that the module housing 200 is unlocked or released from the cage or socket.

Figure 6:
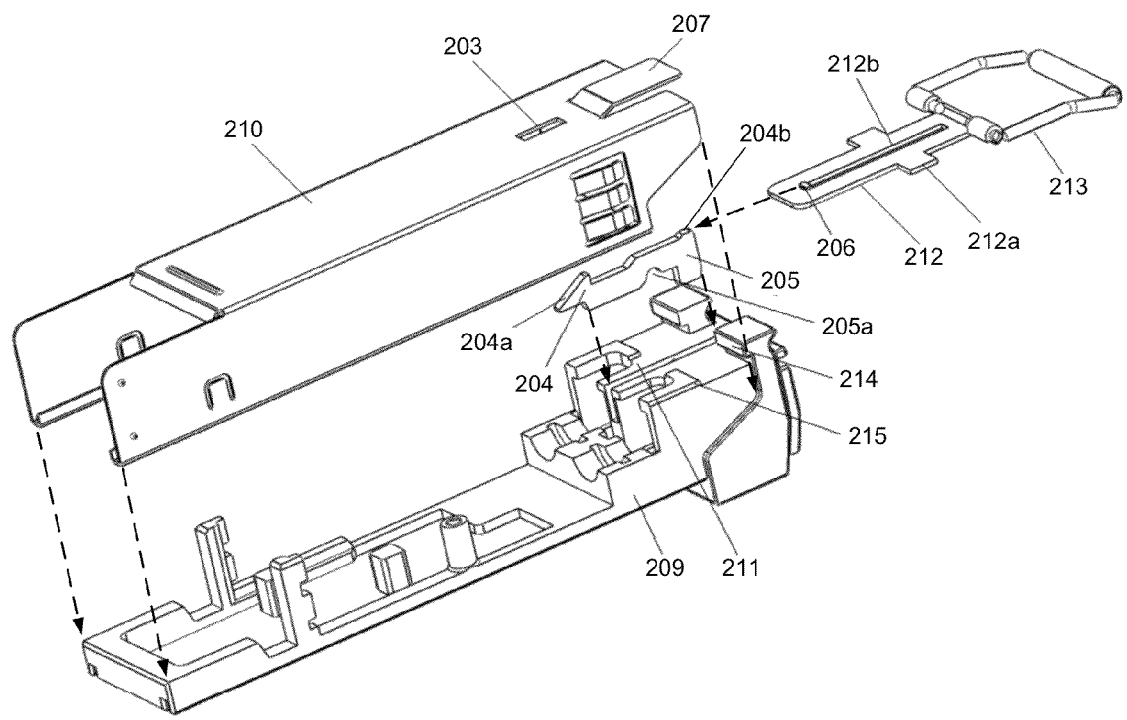
FIG. 6 is an exploded view of the exemplary module housing of FIG. 3, demonstrating the relative positions of the chassis, the latch, slider (with the handle attached) and casing.
Figure 7:
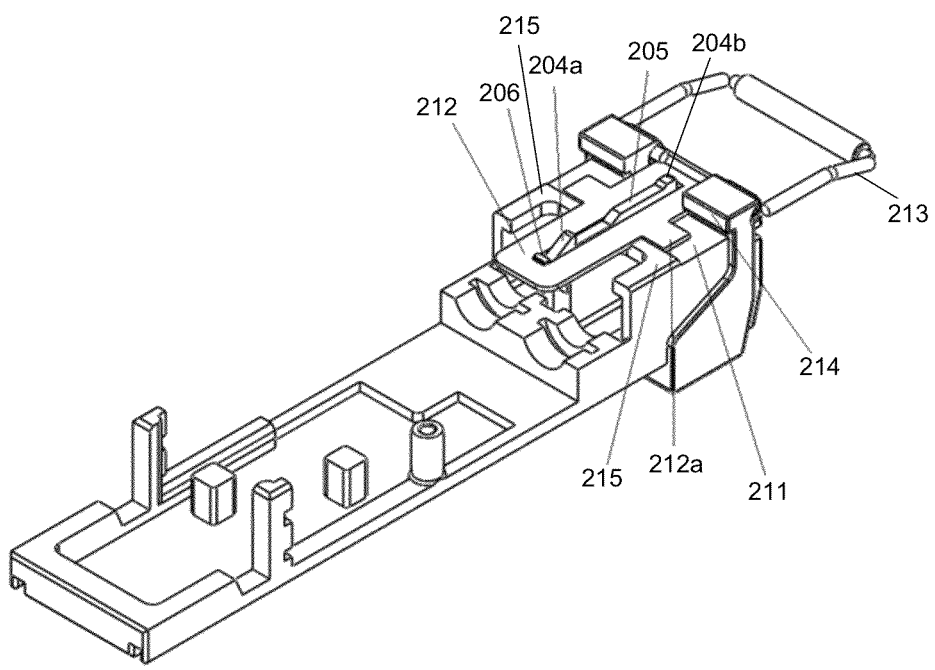
FIG. 7 is a diagram of internal components within the exemplary module housing of FIG. 3, showing the chassis, the latch and the slider assembled.
Figure 8:
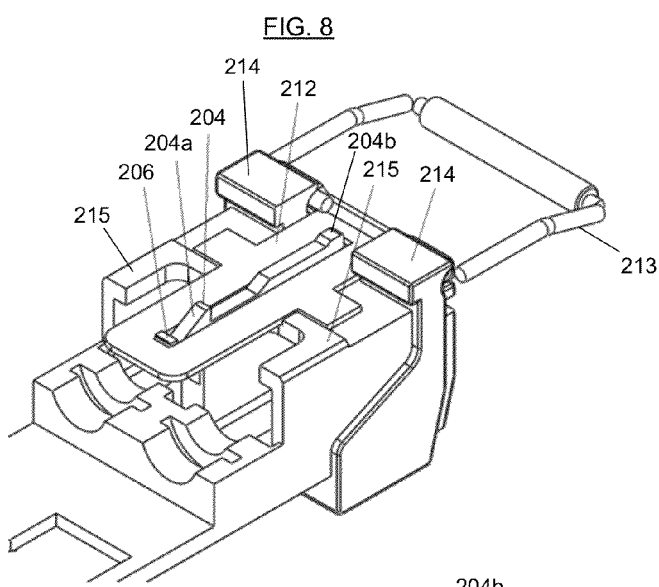
FIG. 8 is an enlarged partial view of the exemplary module housing of FIG. 3, showing the chassis, the latch and the slider assembled.

As shown in FIGS. 6-11, the exemplary module housing 200 comprises a module base or chassis 209 and a casing 210 mounted on the module base or chassis 209 (see FIG. 6). The top face of the casing 210 has a lock hole 203 through the casing 210. The module housing 200 has a tapered end or first projection 204 that can protrude through the top of the module housing 200 via lock hole 203 and further passes through the module housing 200 via lock hole 203 from the inside of the module housing 200. In some embodiments of the present invention, casing 210 of the module housing 200, the module base or chassis 209 may be formed as a whole (e.g., a single piece) with the lock hole 203 in the top surface of the module housing 200, etc.

In one embodiment, the module housing 200 includes an internally-mounted tumbler or latch 205. The tumbler or latch 205 can turn along a vertical plane within the module housing 200. The tapered end or projection 204 is on or integrated into the tumbler or latch 205. An elastic reset device (e.g., a tab or lever) may be included in the module housing 200, near an end of the tumbler or latch 205 opposite to the tapered end or projection 204. The elastic reset device drives the tumbler 205 to reset. Specifically, the tapered end 204 of tumbler 205 is pushed through the lock hole 203 to protrude from the top surface of the module housing 200 and lock the module housing 200 into the socket or cage. The side of the tapered end 204 closest to the electrical interface 202 has an inclined plane 204*a* facing to the outside (e.g., through lock hole 203) from the inside of the module housing 200.

In some embodiments, the slider 212 may have a built-in pressure bar 206, which is configured to fit tightly with the lock hole 203. Pressure bar 206 can move translationally in lock hole 203 (e.g., in a direction parallel to the top surface of the pulling plate or slider 212) and is located above (e.g., to contact and/or apply pressure against) the inclined surface 204*a*. Pressure bar 206 and tumbler or latch 205 form an inclined plane slider mechanism. When releasing the latch 205 (e.g., unlocking the module housing 200), the pressure bar 206 contacts and applies pressure against the inclined plane 204a, and pushes the tapered end 204 into the lock hole 203 and eventually below the top surface of the module housing 200, thereby unlocking the module housing 200 from the socket or cage.

Specifically, when releasing the latch 205, the release force (e.g., the force applied to the slider 212 by pulling the draw bar 213) is applied to pressure bar 206, moving the pressure bar 206 laterally within lock hole 203. Pressure bar 206 contacts the inclined plane 204a, transferring the release force to the tapered end or first projection 204. When the release force is applied to tapered end 204, a component force along tumbler or latch 205 rotates the latch 205 (e.g., on and/or around the pivot 208 in FIG. 10), and the first projection 204 moves down and/or into the module housing 200, thereby unlocking the module housing 200 from the socket or cage. The pressure bar 206 may be attached to slider 212 in and/or adjacent to lock hole 203 by soldering, brazing, welding (or tack welding), pinning, screwing, etc., or by forming pressure bar 206 and slider 212 as a unitary piece (e.g., by molding).

In accordance with the release mechanism of the module housing 200 shown FIGS. 3-11, in order to reset the tapered end 204 (to move from the unlocked position to the locked position), the middle part of tumbler 205 (e.g., arc wall or curved surface 205a in FIGS. 6, 9 and 10) is in contact with and/or connected to the module housing 200, tapered end 204 is on one end of tumbler or latch 205, and an elastic reset device contacts the other end of the tumbler or latch 205. The elastic reset device may be a foldable part or lever 207 mounted on or in the module housing 200. In some embodiments, the foldable part 207 is formed by punching and bending upwards a portion of the top face of casing 210. During the de-latching (unlocking) process, the foldable part 207 contacts and presses against the tumbler or latch 205. The punched and bent top face of casing 210 of the module housing 200 is used as the elastic reset device, which has a high modulus of elasticity and a simple structure, occupies minimal space, and also has the advantage of conserving and/or efficiently using the internal space of the module housing 200.

Figure 11:
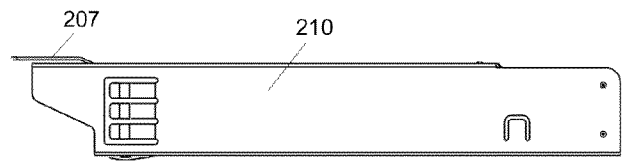
FIG. 11 is a side view of the exemplary module housing of FIG. 3, showing the bent portion of the casing.

As shown in FIG. 11, in some embodiments, the foldable part or bent plate 207 is located in casing 210 above one end of the latch or tumbler 205 opposite to the tapered end 204. Specifically, the foldable part, lever or bent plate 207 is formed by bending the end of the top face of casing 210 upwards (e.g., away from the module housing 200) near the optical interface 201, and optionally, bending the top face of the casing back towards module housing 200. When releasing the latch 205 (unlocking the module housing 200 from the cage or socket), the end of latch or tumbler 205 having the tapered end 204 turns or rotates downward into the module housing 200. At the same time, the foldable part, lever or bent plate 207 contacts and presses against the other end of latch or tumbler 205 nearest to the optical interface 201. Specifically, when the end of latch or tumbler 205 nearest the optical interface 201 contacts and presses against the foldable part, lever or bent plate 207, the spring back or restoring force of the foldable part, lever or bent plate 207 causes the latch or tumbler 205 to tilt or rotate, and thus, reset (e.g., in the absence of the releasing force being applied to the tapered end 204). In some embodiments having a bent plate or lever 207, the plate may be formed from the top surface of the casing 210 (e.g., by cutting, punching, stamping, rolling, bending, etc., or a combination thereof), or the plate may be formed separately (by the same or similar process(es)) and then attached to the top surface of casing 210 (e.g., by welding, soldering, brazing, pinning, folding over an opening in the case, etc.). In any case, the bent plate 207 may be made of a material with a high modulus of elasticity (e.g., steel, titanium and/or titanium alloys, molybdenum, tungsten, tungsten carbide, etc.).

In some embodiments, one end of the latch or tumbler 205 may be attached to or set in the center of the module housing 200, while the other end is connected to or integrated with the tapered end 204. When releasing the module housing 200 from the socket or cage, and, specifically, when the tapered end 204 of the latch or tumbler 205 has a different shape or structure capable of protruding from the top face of the module housing 200, the rotated latch or tumbler 205 may contact and/or engage the foldable part, lever or bent plate 207 (e.g., by clamping) to provide elastic reset.

In yet other embodiments, the elastic reset device may comprise a torsional spring placed between the latch or tumbler 205 and the module housing 200, or a compression spring placed above the end of tumbler 205 nearest the optical interface 201 (e.g., above the second projection 204b), or in relation to other structures which can move the latch or tumbler 205 to reverse its rotational movement around pivot 208 and extend or protrude tapered end 204 above the top face of the module housing 200.

In accordance with an embodiment of the release mechanism of the module housing 200 of FIGS. 3-11, pulling plate or slider 212, to which pressure bar 206 is attached or integrated, is mounted or positioned between the module base or chassis 209 and the casing 210. The upper surface of module base or chassis 209 has a sliding chute 211, that mates or fits tightly with the slider 212. By sliding the pulling plate or slider 212 along sliding chute 211, the pressure bar 206 moves laterally (e.g., parallel to the sliding chute 211 and/or the upper surface of chassis 209, in latch hole 203), which guides the movement of the pressure bar 206. The end of the slider or pulling plate 212 closest to the optical interface 201 is connected to the handle or draw bar 213 located at or near the optical interface 201. In such embodiments, the slider or pulling plate 212 may easily be pulled partially out from the end of the module housing 200 closest to the optical interface 201, which moves the pressure bar 206 to release (unlock) the module housing 200 from the socket or cage. The pulling plate or slider 212 has an elongated or run-through slot 212b, which allows the latch or tumbler 205 to move therein without contacting the slider or pulling plate 212.

When releasing the module housing 200 from the socket or cage, an external releasing force is applied to the handle or draw bar 213, and the pressure bar 206 moves within lock hole 203 and contacts inclined plane 204a. Thus, the releasing force can be transferred to tapered end or projection 204 via the pressure bar 206 contacting the inclined plane 204a. When the releasing force is applied to the tapered end or projection 204, a component force in the direction of rotation of latch or tumbler 205 rotates the tumbler 205 such that the tapered end or projection 204 is rotated into the module housing 200.

The pressure bar 206 is at the end of the elongated or run-through slot 212b closest to the electrical interface 202, and extends from the slider or pulling plate 212 into the lock hole 203. When releasing the latch 205, the pressure bar 206 moves toward and contacts the end wall of lock hole 203 closest to the optical interface 1. After tapered end 204 is unlocked (e.g., moves down into the module housing 200), the handle or draw bar 213 continues to move the tapered end 204 such that the pressure bar 206 contacts and engages the end wall of lock hole 203, and the module housing 200 may be removed from the socket or cage.

In some embodiments, the pressure bar 206 forces the tapered end 204 through the lock hole 203 into the module housing 200 for unlocking via inclined plane 204*a*, and then the pressure bar 206 continues to move towards optical interface 201 until it contacts and engages the end wall of lock hole 203 closest to optical interface 201. Thus, the module housing may be pulled smoothly, quickly and easily removed from the socket or cage during releasing (unlocking).

Figure 9:
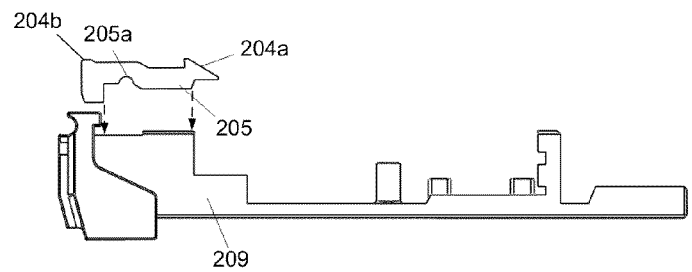
FIG. 9 is a side view of the exemplary module housing of FIG. 3, with the casing removed and showing the relative positions of the chassis and the latch.
Figure 10:
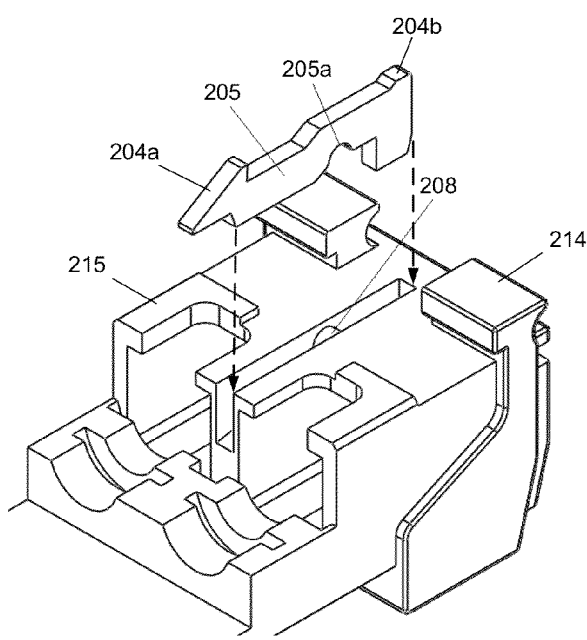
FIG. 10 is an enlarged, exploded partial view of the exemplary module housing of FIG. 3, with the casing and the handle removed and showing the relative positions of the latch and a shaft on which the latch pivots.

In accordance with another embodiment of the present release mechanism shown in FIGS. 3-11, the module housing 200 includes a pivot or spindle 208 that contacts the latch or tumbler 205 at a curved surface or arc wall 205*a* (see FIGS. 9 and 10). Specifically, the module housing 200 has a pivot or spindle 208 inside, and the bottom of tumbler or latch 205 has a curved surface or arc wall 205*a* with an approximately semi-circular shape and an opening facing the bottom of latch or tumbler 205. The arc wall 205*a* mates to and/or fits tightly with the surface of pivot or spindle 208. Thus, a hinge joint or pivot exists between the latch or tumbler 205 and the module housing 200. Such an embodiment has the advantages of having a simple structure that is convenient to assemble. The latch or tumbler 205 is positioned near loch hole or slot 203 in the module housing 200. In some embodiments, the two-dimensional cross-section of curved surface 205*a* may be a semi-circle that has the same or slightly larger radius as pivot 208. In other embodiments, the two-dimensional cross-section of curved surface 205*a* may be an oval, an ellipse or other curved surface capable of rotating on pivot 208.

In some embodiments, the latch 205 may be connected to the module housing 200 by means of mutual rotation, such as by one or more bearing(s), sleeve joint(s) (bushing(s)), a spindle 208, a hinge joint, etc.

In accordance with a further embodiment of the release mechanism shown in FIGS. 3-11, the opposing sides of slider or pulling plate 212 have lugs 212*a* (FIGS. 6-7), which are symmetrically positioned. Lugs 212*a* move between first blocks 214 at the end of sliding chute 211 closest to optical interface 201, and second blocks 215 at the end of sliding chute 211 closest to electrical interface 202. After tapered end 204 is brought within the module housing 200, pulling the handle or draw bar 213 continues to move lugs 212*a* until the lugs 212*a* contact the first blocks 214, and the module housing 200 may be pulled out from the socket or cage. In one embodiment, lugs 212*a* may engage with or be inserted under the first blocks 214, and pressure or force (e.g., by clamping) from the first blocks 214 on the lugs 212*a* may help hold the lugs 212*a* in place while the module housing 200 is removed from the socket or cage.

In some embodiments, and as previously described, the pressure bar 206 mates with or attaches to the end wall of lock hole 203 to secure the slider 212 in a position corresponding to the unlocked status of the module housing 200, so that the module housing 200 may be removed. In further embodiments, the tapered end or projection 204 simultaneously contacts the end wall of lock hole 203 as lugs 212*a* contact the first blocks 214, to secure the position of the latch 205 and the slider 212 as the module housing 200 is pulled from the socket or cage. Based on the embodiments described herein, other embodiments realized by one skilled in the art without creative contribution are to be within the scope of legal protection given to the present invention.

This first exemplary module housing 200 is convenient and, because the module housing has low physical resistance to forces applied in locking and unlocking operations, it is easily operated. Additionally, the first exemplary module housing 200 allows a wider range of direction of the pushing force on pressure bar 206, such that the module housing 200 may be unlocked as long as a component force exists in the rotation direction of the latch 205 when the pressure bar 206 contacts the inclined or angled plane 204*a*, thereby providing a latchable module housing 200 with higher reliability.

Figure 12:
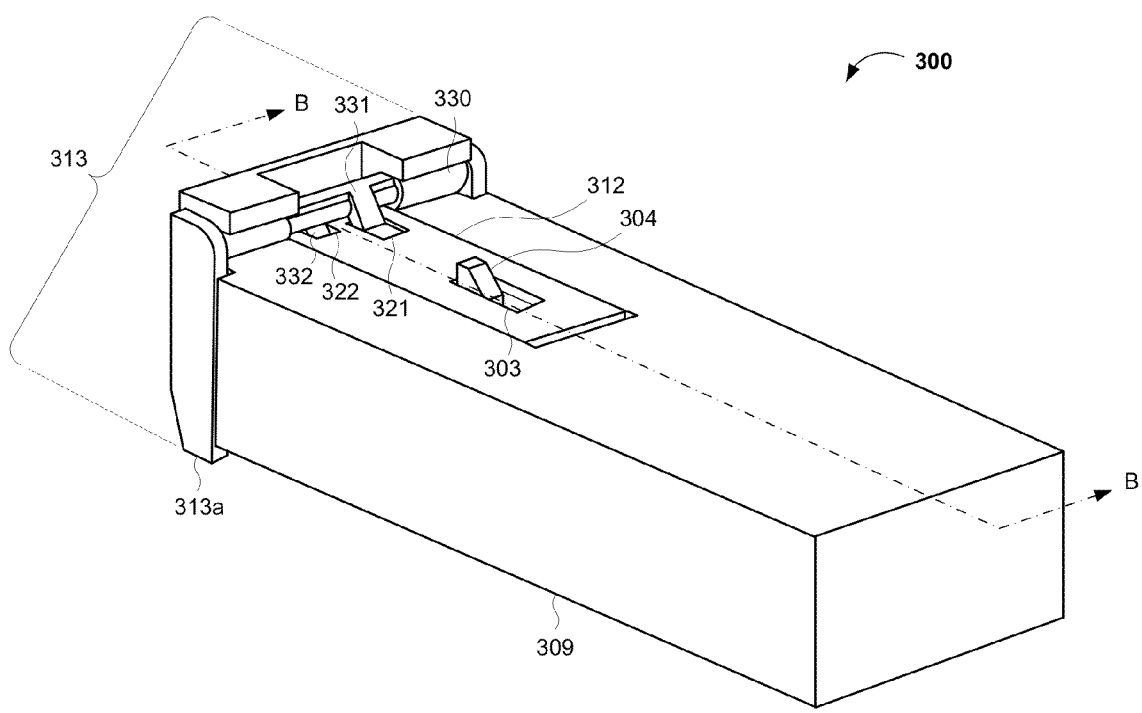
FIG. 12 is a perspective view of a second exemplary embodiment of a module housing showing the handle in the lowered position and the slider and the first projection in a locked position.

Referring now to FIGS. 12-15, a second exemplary module housing 300 is shown. Referring initially to FIG. 12, the module housing 300 comprises (i) a chassis 309, (ii) a slider 312 having two slots 321, 322 and a cutout or slot 303, the slider 312 configured to move with respect to the chassis 309, (iii) a first projection 304 configured to move with respect to the chassis 309 and/or the module housing 300 and secure the chassis 309 and/or the module housing 300 in a complementary and/or corresponding socket in an optical and/or optical/electronic apparatus (not shown), and (iv) a handle 313 having a shaft 330 with two teeth 331, 332, the handle 313 attached to the chassis 309 and configured to be in contact with and/or connected to the slider 312 such that when the handle 313 moves from a first position to a second position, the slider 312 and the first projection 304 move from a locked position or an unlocked position to the other position. FIG. 12 shows the handle 313 in the lowered position and the first projection 304 above a surface of the cutout 303 in the slider 312 (i.e., the "locked" position). In the locked position, most or all of the first tooth 331 is above the first slot 321 and/or the surface of slider 312, and second tooth 332 is meshed and/or mated with second slot 322 such that part or most of the second tooth 332 is through and/or below the surface of slider 312.

The handle end of chassis 309 may include one or more openings or ports for optical fibers, each of the one or more openings being configured to receive an optical fiber (e.g., a single-mode or multimode fiber). The optical fiber may vary in core and/or cladding material, length and/or diameter. The exterior of the chassis 309 may comprise one or more springs (e.g., cage grounding springs; not shown) that may provide some or all of the withdrawal force necessary to remove the module housing 300 from the socket. One or more cavities or regions in the interior of chassis 309 may include electronic and/or optoelectronic components (e.g., one or more laser diodes, photodiodes, laser drivers, amplifiers, etc.; not shown) for converting optical signals into electronic signals and vice versa. The end of chassis 309 opposite the handle end may house electrical components (e.g., one or more circuit boards having one or more signal processors, microcontrollers, memories, etc., thereon) and connector(s) (e.g., SC connectors, LC connectors, APC connectors, etc.) for transmitting electrical signals to and/or from the apparatus into which module housing 300 is inserted. The chassis 309 may comprise a non-ferrous metal (e.g., aluminum, zinc, magnesium, tin, alloys thereof and/or other suitable metal[s]) and/or one or more moldable, high stiffness plastics (e.g., epoxies, polycarbonates, etc.). The chassis may be cast (e.g., die cast), molded (e.g., injection molded), stamped, etc.

The slider 312 may comprise a flat plate or bar, in and/or on the chassis 309, and configured to move with respect to the chassis 309. The slider 312 is also configured to contact and/or move the first projection 304 with respect to a top surface of the chassis 309 and/or module housing 300. In the embodiment of FIG. 12, when the slider 312 moves toward the handle end of the chassis 309, the first projection 304 moves down and/or below the top surface of the chassis 309 through the cutout 303 (i.e., the "unlocked" position). When the slider 312 moves away from the handle end of the chassis 309, the first projection 304 moves up and/or above the top surface of the chassis 309 through cutout 303 (i.e., the "locked" position). However, in other embodiments (e.g., when there is an intermediate gear or similar mechanism between the teeth on the shaft 330 and the slots 321, 322), as the slider 312 moves toward the handle end of the chassis 309, the first projection 304 may move up and/or above the top surface of the chassis 309 (i.e., the locked position), and when the slider 312 moves away from the handle end of the chassis 309, the first projection 312 may move down and/or below the top of the chassis 309 (i.e., the unlocked position).

In some embodiments, the cross-section of the slider 312 may comprise one or more sloped portions and/or one or more curved portions along the length and/or width of the slider 312, as long as the slider 312 is configured to move the first projection 304 with respect to the top surface of the chassis 309. In the exemplary embodiment of FIG. 12, the slider 312 has a rectangular shape when viewed in a plan view. However, in other embodiments, the slider 312 may have any polygonal shape (e.g., a triangle, a quadrilateral, a pentagon, or combination thereof, etc.), or an irregular and/or curved or partially curved shape. In some embodiments, the slider 312 may comprise the same material as the chassis 309. In other embodiments, the slider 312 may comprise a different material than the material of the chassis. In some embodiments, the slider 312 and/or the chassis 309 may be formed from and/or partially or completely coated with one or materials having a low coefficient of friction (e.g., zinc, aluminum, PTFE one or more fluoropolymers, etc.).

In the embodiment of FIG. 12, the cutout 303 has a rectangular shape. However, in other embodiments, cutout 303 may have any regular (e.g., square, triangular, pentagonal, hexagonal, circular, semicircular, or combination thereof, etc.) or irregular shape, as long the cutout 303 is configured to allow the first projection 304 to move down and/or below the top surface of the slider 312 and up and/or above the top surface of slider 312. Slider 312 may have tabs or other projections (not shown) at its sides or side surfaces that run under the uppermost plate of the chassis 309, to secure the slider 312 in the cutout 303 in chassis 309.

In the first embodiment, the handle 313 is rotatably attached to the chassis 309 and comprises arms 313a, a grasping bar (see, e.g., 313b in FIG. 13) and a shaft 330. However, in other embodiments, the handle 313 may be hingedly attached to the chassis 309. In some embodiments the arms 313a, the grasping bar 313b and the shaft 330 may be cast and/or formed as a single piece. In other embodiments, the arms 313a, the grasping bar 313b and the shaft 330 may comprise two or more pieces, fixedly attached to each other (e.g., by screwing, pinning, pressing, crimping, etc.). In some embodiments the arms 313a, the grasping bar 313b and the shaft 330 may be formed from the same material or materials (e.g., when the arms 313a, the grasping bar 313b and the shaft 330 are cast and/or formed as a single piece). In embodiments where the arms 313a, the grasping bar 313b and the shaft 330 comprise two or more pieces, the arms 313a, the grasping bar 313b and the shaft 330 may be formed from different materials.

In some embodiments, the handle 313 may comprise the same material(s) as the chassis 309. In other embodiments, the handle 313 may be made of one or more materials different from the chassis 309 (e.g., aluminum, zinc, magnesium, tin, alloys thereof and/or other suitable metal[s]) and/or one or more types of moldable, high stiffness plastics (e.g., epoxies, polycarbonates, etc.).

Figure 13:
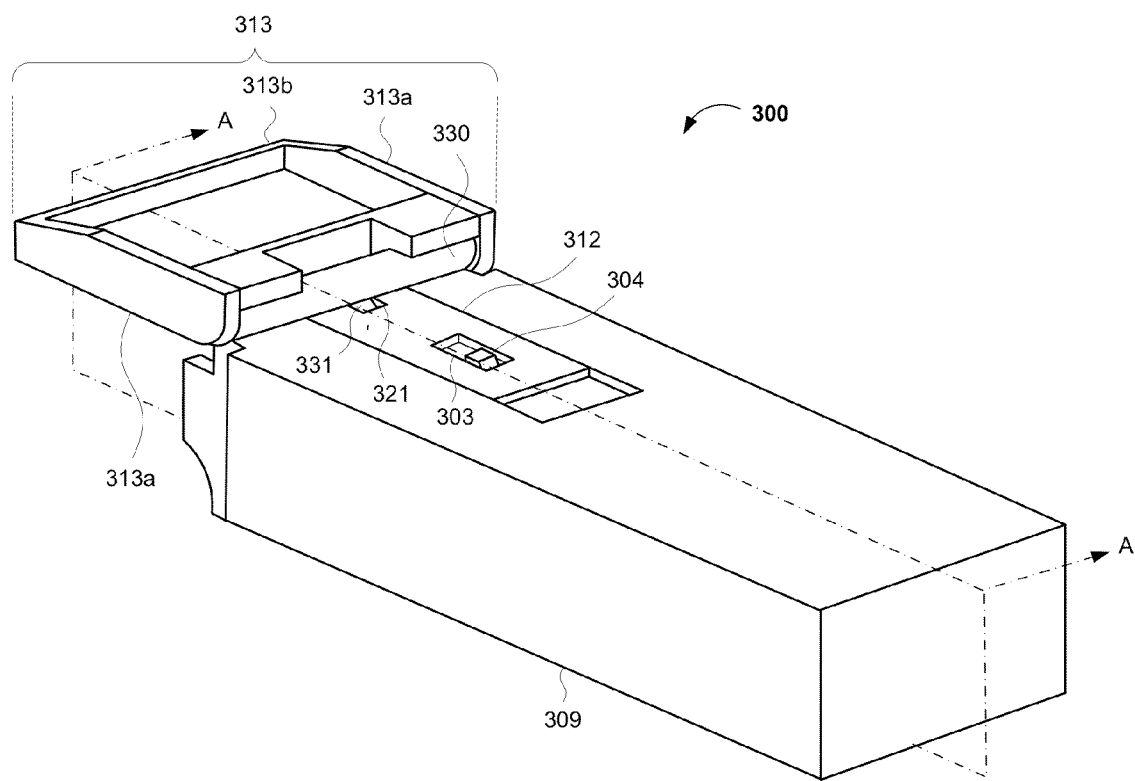
FIG. 13 is a perspective view of the exemplary module housing of FIG. 12, showing the handle in the raised position and the slider and the first projection in an unlocked position.

As shown in FIG. 12, the shaft 330 comprises two teeth 331, 332, each of the two teeth 331, 332 fixedly attached to the shaft 330 at a different location along the circumference and along the length of the shaft 330 from the other one of the two teeth 331, 332. The slider 312 comprises slots 321, 322, which are configured to mesh and/or mate with the two teeth 331, 332. Consequently, the slots 321, 322 may be located across the width of the slider 312 at locations corresponding to the locations of the two teeth 331, 332 along the length of the shaft 330. Likewise, the two slots 321, 322 may be located along the length of slider 312 at locations such that when the handle 313 is rotated from a lowered position to a raised position, one of the two teeth 331, 332 meshes and/or mates with one of the two slots 321, 322 so as to move the slider 312 and the first projection 304 from a locked position to an unlocked position. Additionally, when handle 313 is rotated from the raised position to the lowered position, the other one of the two teeth 331, 332 meshes and or mates with the other one of the two slots 321, 322 so as to move the slider 312 and the first projection 304 from the unlocked position to the locked position. The meshing and/or mating of the teeth 331, 332 and the slots 321, 322 provides positive engagement of the handle 313 with the slider 312, and thus, reliably moves the slider 312 when the handle 313 is moved from one position to the other. Additionally, the shaft 330 may have more than two teeth (e.g., 3, 4 or more) so long as the slider 312 has the same number of corresponding slots. In such embodiments, two or more teeth may mesh with two or more slots to move the slider 312, in one direction and/or in an opposite direction FIG. 13 shows the exemplary module housing 300 of FIG. 12 with the handle 313 (comprising arms 313a and a grasping bar 313b) in a raised position, and the slider 312 and the first projection 304 in an unlocked position. In the raised position, the handle 313 is approximately 90 degrees from the lowered position of the handle 313 (see, e.g., FIG. 12). In the unlocked position, an uppermost surface of the first projection 304 is flush with or below a top surface of the slider 312 and/or the chassis 309. Additionally, and as can be seen from a comparison of FIGS. 12 and 13, in the unlocked position, the slider 312 moves towards the handle end of the chassis 309 when the first tooth 331 is meshed and/or mated with first slot 321.

In some embodiments, the raised position of the handle 313 may be from about 30 degrees to about 180 degrees (e.g., 30 degrees, 45 degrees, 90 degrees, 120 degrees, etc.) from the lowered position. In some embodiments, the handle 313, the slider 312 and the first projection may be configured to move the slider 312 in the opposite direction (i.e., when the handle 313 is in the raised position, the slider moves away from the handle end of the chassis 309 to cause the first projection 304 to retract below and/or into the cutout 303).

Figure 14:
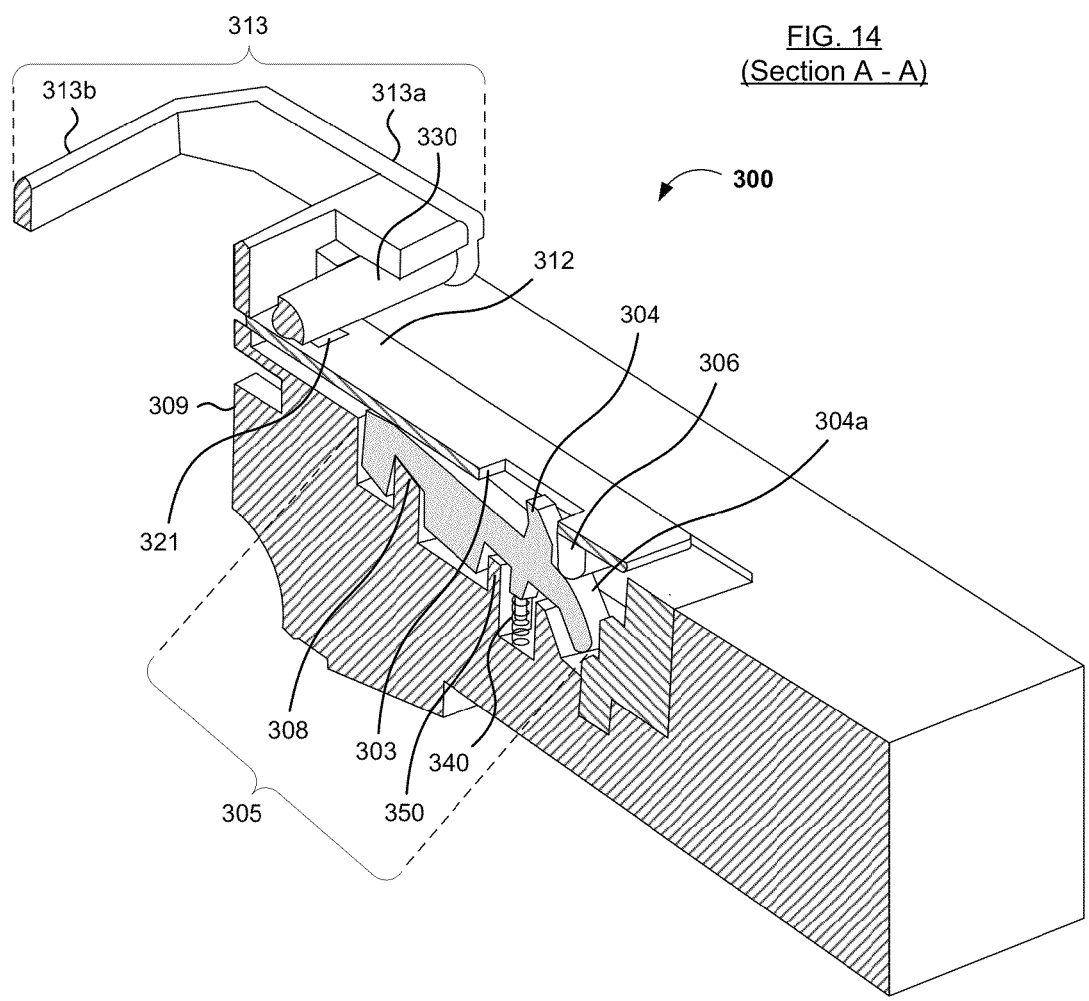
FIG. 14 is a cross-sectional view of the exemplary module housing of FIG. 12, showing the handle in the raised position, and the slider, the first projection, a latch and an optional spring in the unlocked position.

In the cross-sectional view of FIG. 14, the handle 313, comprising arm 313a, the grasping mechanism 313b and shaft 330, is in the raised position, the slider 312 and first projection 304 are in the unlocked position, and a pivot 308 and a latch 305 are shown inside of the chassis 309 and/or the module housing 300. The latch 305 comprises first projection 304, which may be attached to and/or formed with latch 305. The latch 305 is configured to move on and/or around the pivot 308 such that when the slider 312 moves towards the handle 313, a pressure bar 306 attached to or integral with the slider 312 slides along the curved upper surface 304a of the latch 305, which causes the first projection 304 to move down and/or below the top surface of the slider 312 and/or the chassis 309 (the unlocked position). Alternatively, the curved upper surface 304a of the latch 305 may have (or be replaced with) a straight or planar (but angled) surface. Similarly, when the pressure bar 306 moves away from the first projection 304, the first projection 304 then moves up and/or above the top surface of slider 312 (the locked position). In some embodiments, an optional spring 340 provides a force on the latch 305 to cause the latch 305 to be in the locked position in the absence of a force on the upper surface 304a of the latch 305 from the pressure bar 306.

The pivot 308 may be formed with and/or cast as part of the chassis 309. Alternatively, the pivot 308 may be formed separately, and be attached to the chassis 309. In the embodiment of FIG. 14, the pivot 308 has opposed vertical (or nearly vertical), substantially parallel sides and an uppermost surface angled downward and/or away from the handle end of chassis 309. The angled uppermost surface of the pivot 308 may be configured to stop the rotational and/or downward movement of the latch 305 beyond a predetermined angle and/or distance, thereby preventing the first projection 304 from dropping too far below the surface of the slider 312 and/or a top surface of the module housing 300 and/or being caught or trapped beneath the slider 312. This function may also (or alternatively) be provided by rotation stop 350, under latch 305. Alternatively, the pivot 308 may have a substantially horizontal uppermost surface. Although FIG. 14 shows a trapezoidal-shaped pivot cast or formed as part of the chassis, the invention is not so limited, and other shapes or configurations are contemplated for pivot 308. As a practical matter, the pivot 308 may have any suitable two-dimensional cross-section or three dimensional shape on and/or around which a corresponding portion of the latch 305 may rotate or move such that the latch 305 locks and/or unlocks the module housing 300 into a socket configured to accept the module housing 300.

For example, two-dimensional cross-sections of the pivot 308 may include an upside down "V" shape, an upside down "U" shape, an oval, an ellipse, a semi-circle, a triangle (e.g., a right, an equilateral, an obtuse or an acute, etc.), a quadrilateral (e.g., a square, a rectangle, a rhombus, a diamond, etc.) a pentagon, a hexagon, and/or other polygonal shape and/or a combination thereof, etc. Three-dimensional shapes of the pivot 308 may include a prism (e.g., rectangular, triangular, pentagonal, etc), a cube, a cylinder, a cone, a pyramid, a sphere, a hemisphere, a polyhedron, etc. In some embodiments, the pivot 308 may be irregularly shaped and/or formed from an arc or a series or combination of arcs, and may have any length(s) and/or other dimension(s) that facilitate placement and/or operation of the latch 305.

In some embodiments, the pivot 308 and/or a corresponding portion of the latch 305 may be lubricated (e.g., with graphite, Teflon, molybdenum disulfide, tungsten disulfide, etc.) in order to reduce the friction and/or wear of the surface of the pivot 308 in contact with the latch 305. In some embodiments, the pivot 308 may comprise one or more of the same materials as the chassis 309 (e.g., when the pivot 308 is cast or formed as part of the chassis 309), or may comprise a different material from the material(s) of the chassis 309 (e.g., when the pivot 308 and the chassis 309 are formed separately).

Figure 15:
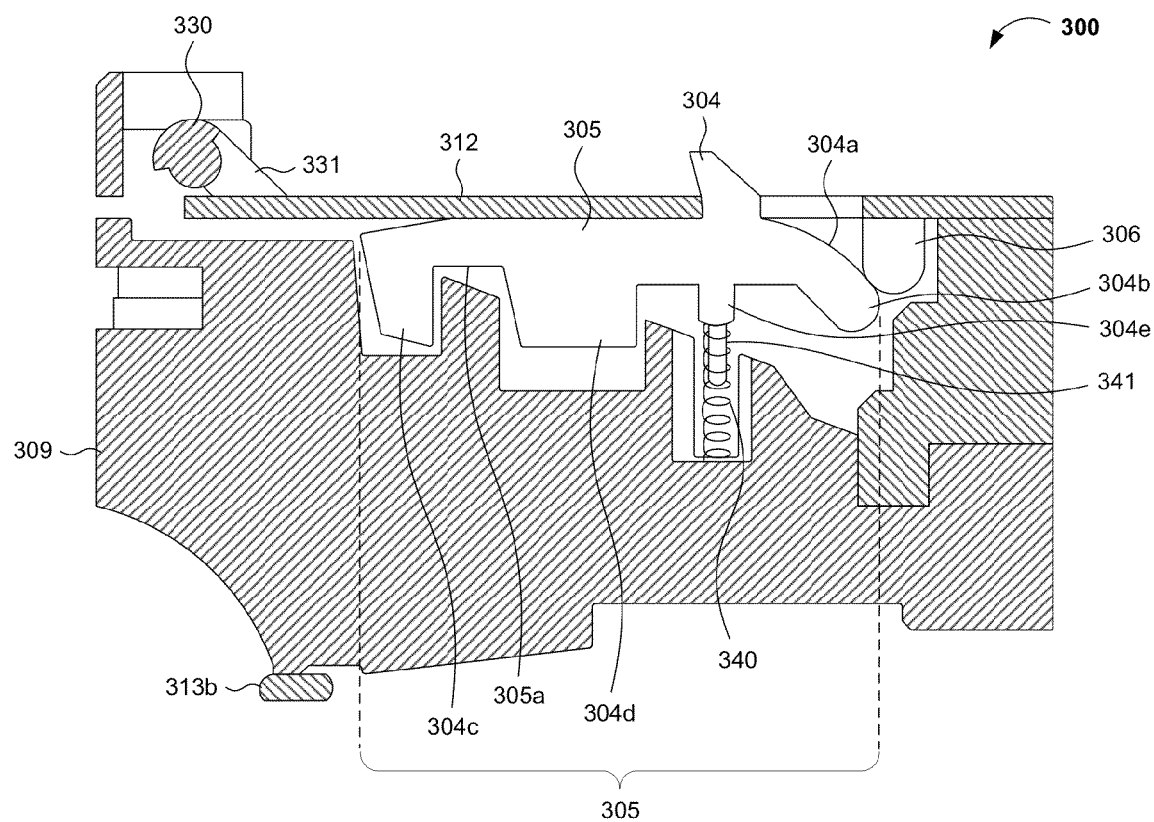
FIG. 15 is a second cross-sectional view of the exemplary module housing of FIG. 12, showing the slider, the first projection, the latch, and the optional spring in the locked position.

Referring now to FIG. 15, a side-on cross-sectional view of the chassis 309 shows the latch 305, the latch projection 304, and the slider 312 in the locked position. In the embodiment of FIG. 15, the latch 305 comprises first through fifth projections 304 and 304b-304e. The first projection 304, which is configured to secure the chassis 309 and/or the module housing 300 in a corresponding and/or complementary socket, comprises an uppermost edge or surface that is substantially horizontal with respect to the top surface of the slider 312 when the latch 305 is in the locked position. Each of the edges or surfaces of the opposing sides of the first projection 304 extend downward from the uppermost surface of the first projection 304 at an angle. In the embodiment shown in FIG. 15, the edges initially extend downward at different angles. However, at or near the surface of the slider 312, the angle of each of the sides of the first projection 304 changes such that the opposing sides are vertical (or nearly vertical) for a distance roughly equal to or slightly greater than the thickness of the slider 312.

In other embodiments, the first projection 304 may have any shape that may be configured to securely lock the module housing 300 into the corresponding module socket. For example, in some embodiments, the projection 304 may have one or more polygonal shapes, such as a triangle (see, e.g., first projection 404 of FIG. 17), a quadrilateral (e.g., a square, a rectangle, a rhombus, a diamond, etc.) a pentagon, a hexagon, and/or other polygonal shape and/or a combination thereof, etc. In some embodiments, a portion of the first projection 304 may be non-planar, and may comprise one or more compound angles and/or curved surfaces. In some embodiments, the uppermost surface of the first projection 304 may be at an angle other than 0° or 180° relative to the top surface of the slider 312. In yet other embodiments, the first projection 304 may have an upside down "V" shape or other shape as described herein.

The second through fifth projections 304b-304e of FIG. 15 may control and/or guide the movement of the latch 305 in relation to the chassis 309 and/or module housing 300. For example, when the latch 305 is moved from the locked position to the unlocked position, a curved (e.g., a semi-circular, an oval, an elliptical, etc.) surface 304a of the second projection 304b slides along and/or moves in relation to a corresponding surface in the chassis 309 so as to guide the latch 305 smoothly down and/or away from the top surface of the chassis 309 and/or module housing 300. The third and fourth projections 304c, 304d are confined by corresponding spaces and/or voids in chassis 309, thereby preventing rotation of the latch 305 beyond a predetermined point. In FIG. 15, the fifth projection 304e, having an spring extension 341, contacts and/or is attached to the optional spring 340, which may be compressed when the latch 305 is in the unlocked position. The optional spring 340 may be configured to return the latch 305 to the locked position when the handle (see, e.g., 313 in FIGS. 12 and 13) is released or otherwise returns to the lowered position. The spring extension 341 may be attached to the fifth projection 304e and may be configured to fit inside of spring 340 so as to prevent misalignment of the spring 340 with the latch 305 and/or the fifth projection 304e.

In some embodiments, one or more of the first through fifth projections 304, 304b-304e and/or other portions of the latch 305 may not be planar, and instead, may be angled, curved, irregularly shaped and/or offset within the cross-section of latch 305 so as to fit within the chassis 309 and/or facilitate and/or restrain the movement of the latch 305 within the chassis 309 and/or the module housing 300. In some embodiments, one or more of the first through fifth projections may have a shape different than the shape of the first though fifth projections 304, 304b-304e shown in FIG. 15 (see, e.g., projection 404 and 404b-404e in FIG. 17).

Figure 16:
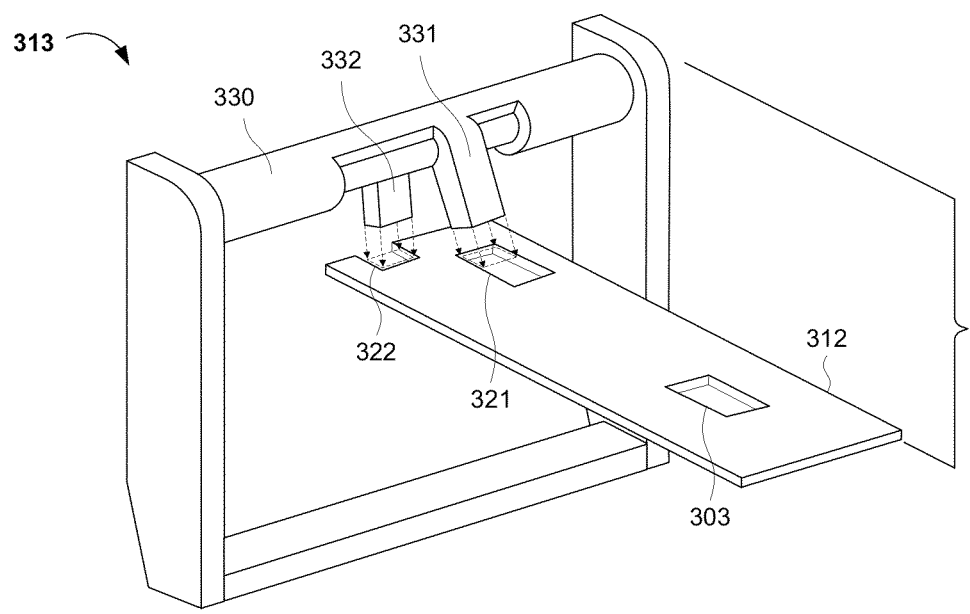
FIG. 16 is an exploded view of the exemplary handle and slider of FIG. 12, demonstrating the position of the two teeth on the handle in relationship to the position of the two slots in the slider.

FIG. 16 is an exploded view showing the slider 312 separated from the handle 313 such that the relative positions of (i) the teeth 331 and 332 on the shaft 330 of the handle 313 and (ii) the slots 321, 322 in the slider 312 are visible. As shown, the first tooth 331 is located apart from the second tooth 332 at an angle of about 30 degrees along the circumference of the shaft 330 so that when the handle 313 is in the lowered position, most or all of the first tooth 331 is disengaged (i.e., outside and/or above) from the first slot 321, and most or all of the second tooth 332 is meshed and or mated (i.e., is in or in contact) with the second slot 322. When the handle 313 is moved from the lowered to the raised position, the shaft 330 rotates such that the first tooth 331 meshes and/or mates with the first slot 321 and pulls the slider 312 closer to and/or under the handle 313, thereby moving or rotating the latch (e.g., the latch 305 of FIG. 15) from the locked position to the unlocked position. At the same time, most or all of the second tooth 332 disengages from the second slot 322. When the handle 313 is moved from the raised position to the lowered position, the second tooth 332 meshes and/or mates with the second slot 322 and pushes the slider 312 away from and/or out from under the handle 313, thereby moving or allowing the latch to move or rotate from the unlocked position to the locked position. At the same time, most or all of the first tooth 331 disengages from the first slot 321.

In other embodiments, the angle between the teeth 331, 332 may be as little as 15 degrees or as much as 90 degrees (e.g., 18 degrees, 22.5 degrees, 30 degrees, 45 degrees, 60 degrees, etc.) as long as at least one of the teeth 331, 332 is meshed and/or mated with one of the slots 321, 322 in each of the locked and the unlocked positions. In some embodiments (e.g., when there is an intermediate gear or similar mechanism between the teeth 331, 332 and the slots 321, 322), when the handle 313 is moved from the lowered position to the raised position, the slider 312 moves away from and/or out from under the handle 313, thereby moving the slider 312 and the latch from the locked position to the unlocked position. In other embodiments, the number and positions of teeth and slots may be different than the number and positions of the teeth 331, 332 and slots 321, 322 in FIG. 16 as long as the teeth and the slots are configured to mesh and/or mate to move the slider 312 toward and/or away from handle 313.

Figure 17:
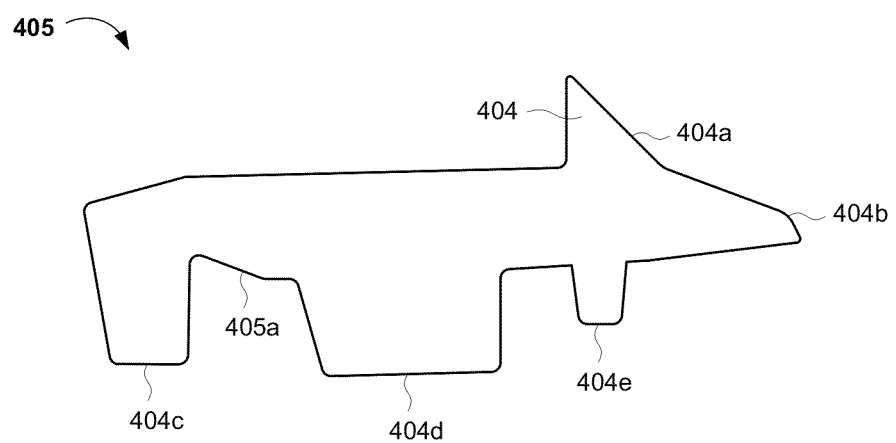
FIG. 17 is a side view of an alternative embodiment of the latch in the exemplary module housing of FIG. 12.

FIG. 17 shows an alternative embodiment of a latch 405, having a first projection 404 and second through fifth projections 404b-404e. The first projection 404 and second through fifth projections 404b-404e of FIG. 17 are configured and/or shaped differently than the first projection 304 and the second through fifth projections 304b-304e of FIG. 15. For example, in contrast to the first projection 304 of FIG. 15. which has a substantially flat uppermost surface, the first projection 404 of latch 405 is substantially triangular in shape, and therefore, angles downward from an uppermost edge. Additionally, the second projection 404b of FIG. 17 has less curvature than the second projection 304b of FIG. 15. Such differences in the shape and/or configuration of the first through fifth projections may accommodate differences in the design of (i) the sockets into which the module housing locks and/or (ii) the chassis to accommodate different electrical and/or optical/electrical components. As one of ordinary skill in the art may contemplate, various shapes and/or configurations of latches are possible, and the present invention is not limited to the specific embodiments shown herein.

Figure 18:
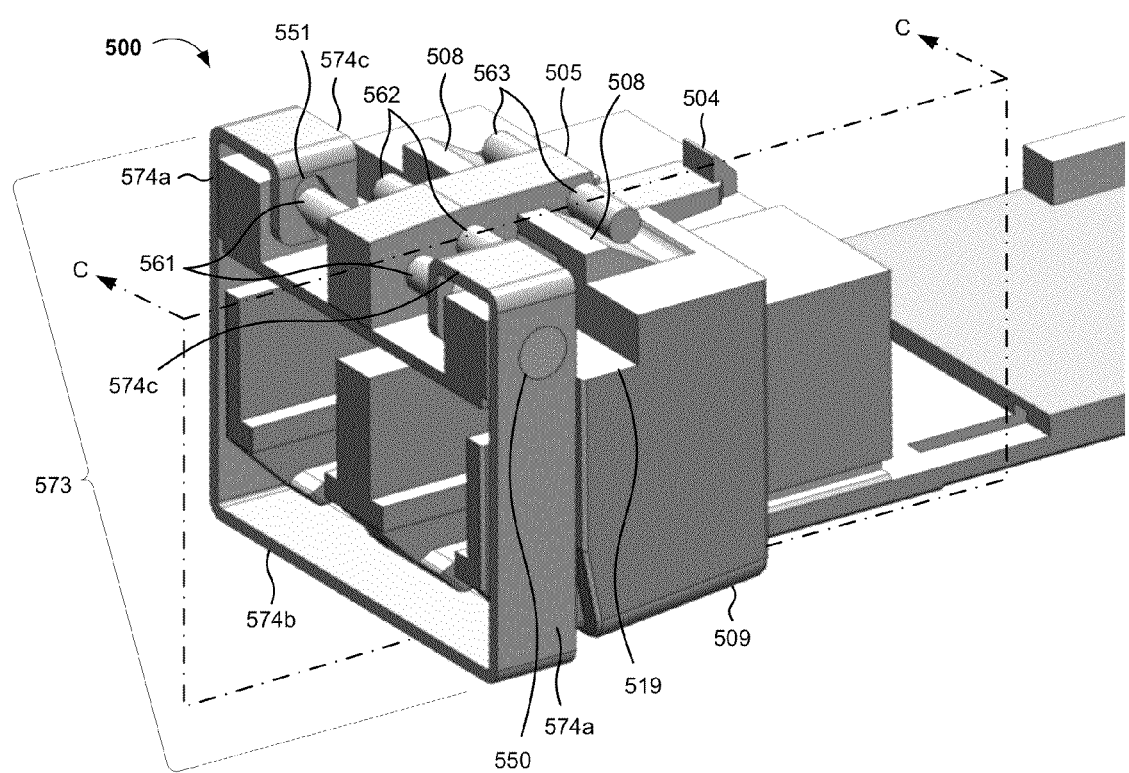
FIG. 18 is a perspective view of a third exemplary embodiment of a module housing, showing a handle in the lowered position, and a slider and a projection in a locked position (shown without the exterior casing for clarity).

Referring now to FIGS. 18-21, a third exemplary module housing 500 is shown. Referring initially to FIG. 18 (which shows the module housing 500 with its exterior casing removed for clarity), the module housing 500 comprises (i) a chassis 509, (ii) two pivots 508, (iii) a handle 573 having arms 574a, grasping bar 574b and upper bars 574c, and (iv) a latch/slider 505 located between the two pivots 508 and having a projection 504 and first through third slider pins 416-418. In FIG. 18, the handle 573 is shown in the lowered position, and the latch/slider 505 and the projection 504 in the locked position. Similar to the second embodiment of FIG. 12, the latch/slider 505 is configured to move with respect to the chassis 509. However, the third exemplary module housing 500 of FIG. 18 differs from the second exemplary module housing 300 of FIG. 12 in that (i) the module housing 500 comprises two pivots 508 (one on either side of the latch/slider 505, (ii) the latch/slider may comprise a single unitary body (i.e., one piece), and (iii) when the latch/slider 505 moves away from the handle end of the chassis 509, the projection 504 moves down and/or below the top surface of chassis 509 (i.e., the "unlocked" position), and when the latch/slider 505 moves toward the handle end of chassis 509, the projection 504 moves up and/or above the top surface of the chassis 509 (the "locked" position).

As shown in the embodiment of FIG. 18, the arms 574a of the handle 573 are attached to the chassis 509 by shafts or pins 550. The upper bars 574c of handle 573 are attached to latch/slider 505 by first slider pins 561. When the handle 573 is moved from the lowered position to the raised position (see FIG. 19), (i) the upper bars 574c of the handle 573 are moved or rotated down and/or into a cutout 519 in the chassis 509, (ii) the first slider pins 561 move and/or rotate the handle end of the latch/slider 505 up and/or away from the chassis 509 due to an offset of the shafts or pins 550, and (iii) the third slider pins 563 move and/or rotate the far end of the latch/slider 505 down and/or into the chassis 509 (the unlocked position).

The latch/slider 505 comprises a projection 504 having a three-dimensional prism shape (e.g., a triangular) that is configured to lock the module housing 500 in a corresponding and/or complimentary module socket. However, the projection 504 may have any two-dimensional or three-dimensional shape (see, e.g., the shapes described above for the first projection 304 of FIGS. 12-15) that may be configured to securely lock the module housing 500 in the corresponding and/or complementary socket and/or allow the module housing 500 to be removed, depending on the position of the handle 573. The projection 504 may be formed or integrated with (e.g., by molding, casting, etc.) and/or attached to (e.g., by welding, soldering, brazing, pinning, screwing, etc.) the latch/slider 505.

In some embodiments, the latch/slider 505, the projection 504 and/or the first through third slider pins 561-563 may be cast and/or formed as a single piece. In other embodiments, the latch/slider 505 may be cast and/or formed as one piece, the projection 504 as another separate piece, and/or each of the first through third projections 561-563 as yet other separate piece(s). In some embodiments, the latch/slider 505, the projection 504 and the first through third slider pins 561-563 may comprise aluminum, zinc, magnesium, tin, alloys thereof and/or other suitable metal[s]) and/or one or more types of moldable, high stiffness plastics (e.g., epoxies, polycarbonates, etc.). In additional or alternate embodiments, the slider 505 and/or the chassis 509 may comprise (e.g., be formed from and/or partially or completely coated with) one or materials having a low coefficient of friction (e.g., zinc, aluminum, PTFE or another fluoropolymer, etc.).

In the embodiment of FIG. 18, each of the upper bars 574c comprises an L-shaped bracket having a slot 551 in the vertical face of the "L." The slots 551 are configured such that the first slider pins 561 mesh and/or mate with the slots 551. When the handle 573 is moved from the lowered position to the raised position (see FIG. 19), the slots 551 rotate on and/or around the first slider pins 561 such that the upper bars 574c move down into cutout 519 in chassis 509, and the latch/slider 505 moves away from the handle end of the chassis 509 due to the offset of the shaft or pins 550. However, in other embodiments, each of the upper bars 574c may comprise a different shaped bracket (e.g., a "C" shape, a "U" shape, a "hat" shape, two "L" shapes and/or a combination thereof, etc.) and may have any lengths(s) and or other dimension(s) to facilitate attachment and/or operation of the handle 573. In yet other embodiments, the upper bars 574c may have cutouts of a different shape (e.g., circular, elliptical, square, rectangular, combinations thereof, and/or other suitable shape[s]) in lieu of slots 551.

Figure 19:
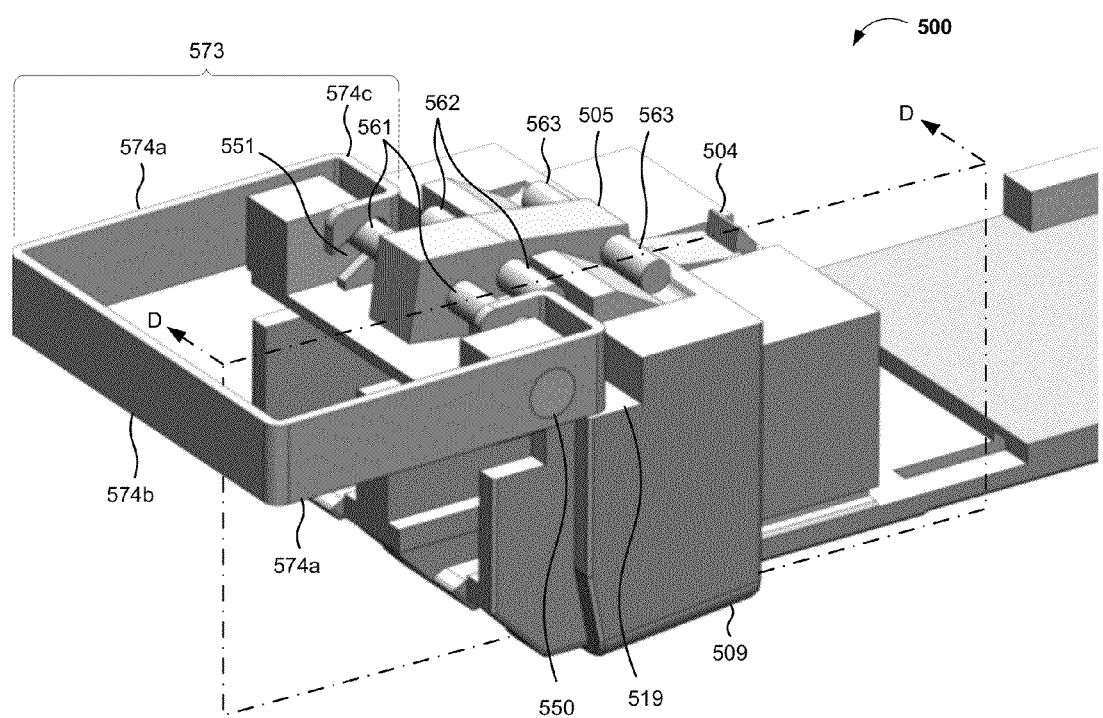
FIG. 19 is a perspective view of the exemplary module housing of FIG. 18, showing the handle in the raised position, and the slider and the projection in an unlocked position (shown without the exterior casing for clarity).

FIG. 19 shows the exemplary module housing 500 of FIG. 18 (with its exterior casing removed for clarity) with the handle 573 in the raised position, and the latch/slider 505 and the projection 504 in an unlocked position. In the raised position, the upper bars 574c are moved or rotated down into the cutout 519 in the chassis 509, and the first slider pins 561 are positioned away from the handle end of the chassis 509 due to an offset from the shafts or pins 550. When the handle 573 is moved from the raised position to the lowered position (see FIG. 18), (i) the upper bars 574c are moved and/or rotated up and/or out of the cutout 519, (ii) the first slider pins 561 move and/or rotate the handle end of the latch/slider 505 down and/or toward the chassis 509 due to the offset of the shafts or pins 550, and (iii) the third slider pins 563 move and/or rotate the far end of the latch/slider 505 up and/or out of the chassis 509 (the locked position). In the raised position, the handle 573 may be at an angle of from about 30 degrees to about 180 degrees (e.g., 30 degrees, 45 degrees, 90 degrees, 120 degrees, etc.) from the lowered position, and the far end of the latch/slider 505 is lowered and/or angled down such that the projection 504 is flush with or below the surface of the chassis 509.

Figure 20:
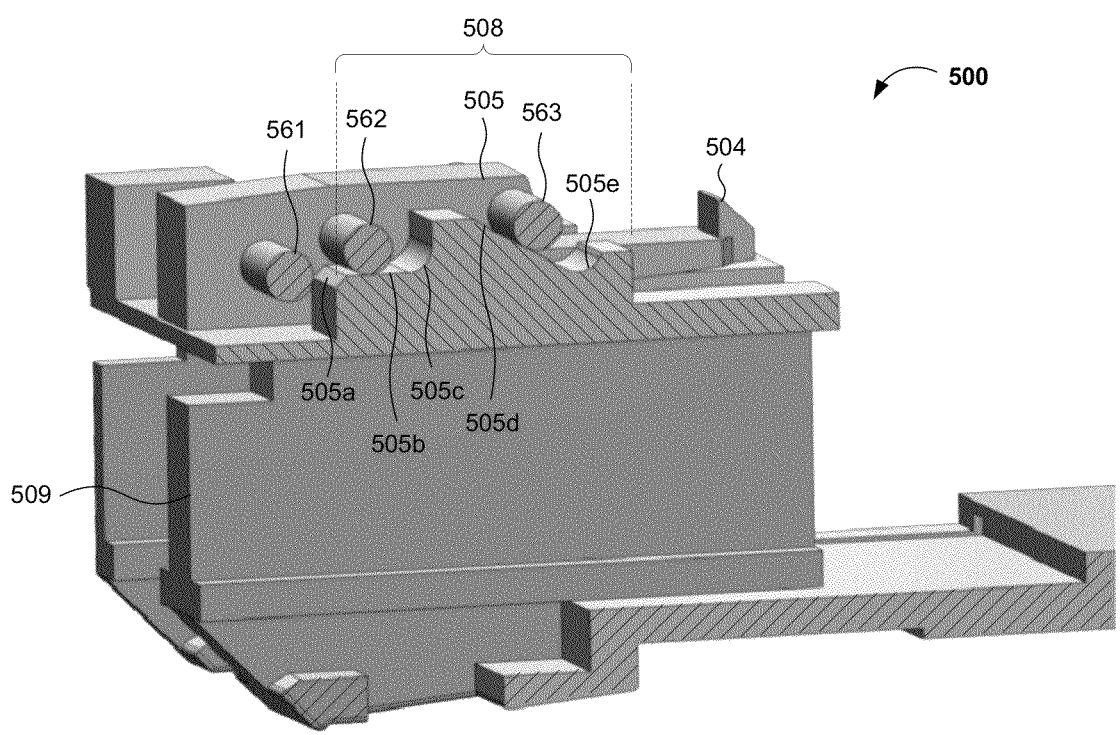
FIG. 20 is a cross-sectional view of the exemplary module housing of FIG. 18, showing the slider, the projection and a latch in the locked position (shown without the exterior casing and the handle for clarity).

In the cross-sectional view of FIG. 20 (in which the handle and the exterior casing of module housing have been removed for clarity), one of the two pivots 508 is shown, and the latch/slider 505 and the projection 504 are in the locked position. A second pivot 508 (not shown in FIG. 20) is located on the opposite side of latch/slider 505, and operates in an identical manner as the pivot 508 shown in FIG. 20. The pivot 508 in FIG. 20 has an irregular shape and may comprise one or more vertical or substantially vertical surfaces, one or more curved surfaces and/or one or more angled surfaces. The latch/slider 505 is configured to move on the pivots 508 such that when the latch/slider 505 moves away from the handle end of chassis 509 (the handle end is to the left in FIG. 20), (i) the first slider pins 561 move and/or rotate the handle end of the latch/slider 505 up and/or away from the chassis 509, (ii) the second slider pins 562 move and/or slide substantially horizontally on an upper surface of the pivots 508 away from the handle end of the chassis 509, and (iii) the third slider pins 563 move and/or slide down and/or away from the handle end of chassis 509 on the angled surfaces of pivots 508, thereby moving and/or rotating the far end of the latch/slider 505 and projection 504 down and/or into the chassis 509 (see FIG. 21).

Figure 21:
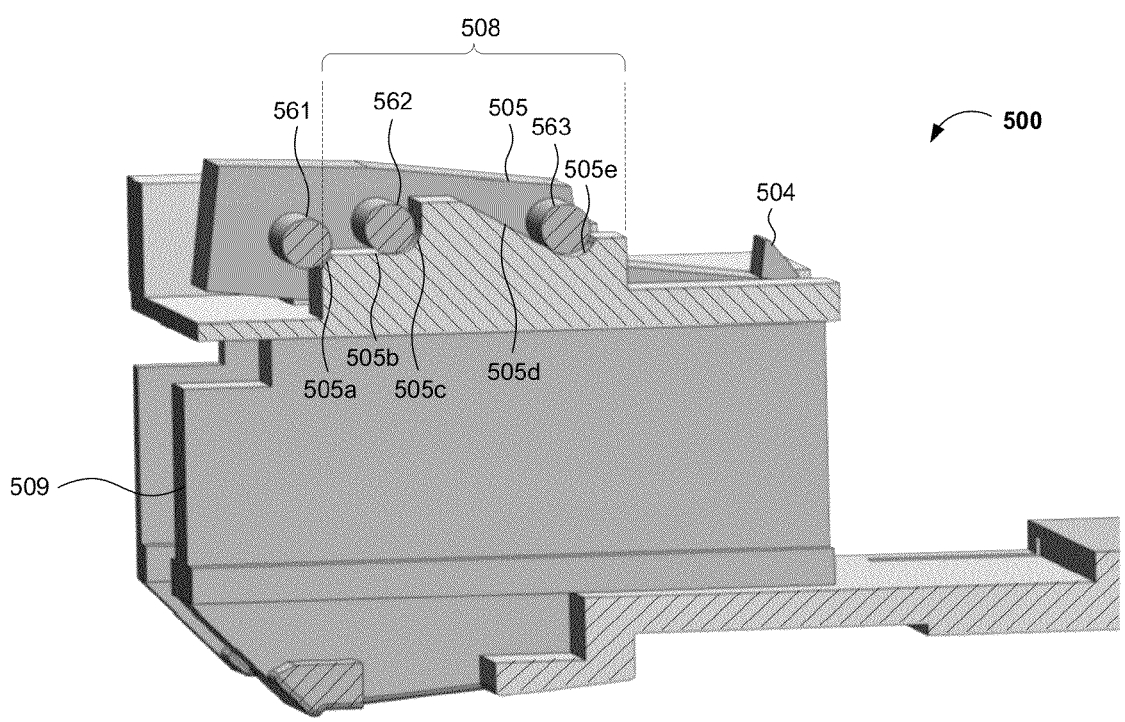
FIG. 21 is a cross-sectional view of the exemplary module housing of FIG. 18, showing the slider, the projection and the latch in the locked position (shown without the exterior casing and the handle for clarity).

In the cross-sectional view of FIG. 21 (in which the handle and the exterior casing of module housing have been removed for clarity), the latch/slider 505 and the projection 504 are in the unlocked position. When the latch/slider 505 moves toward the handle end of chassis 509, (i) the first slider pins 561 move and/or rotate the handle end of the latch/slider 505 down and/or away from the chassis 509, (ii) the second slider pins 562 move and/or slide substantially horizontally on a surface of the pivots 508 toward the handle end of the chassis 509, and (iii) the third slider pins 563 move and/or slide up and/or toward the handle end of chassis 509 on the angled surfaces of pivots 508, thereby moving and/or rotating the far end of the latch/slider 505 and projection 504 up and/or out of the chassis 509 (see FIG. 20).

In some embodiments, the first through third slider pins 561-563 may be fixedly attached to the latch/slider 505 by welding, soldering, brazing, solvent welding and/or gluing, or the ends of the first through third slider pins 561-563 may be threaded and screwed into corresponding threads in latch/slider 505 and/or otherwise coupled or connected to the latch/slider 505. In other embodiments, each of the first through third slider pins 561-563 may be a continuous shaft or pin that extends through a hole in the latch/slider 505. In such embodiments, the first through third slider pins 561-563 may be pressed into and/or adhered (e.g., glued) to latch/slider 505. In other such embodiments, the latch/slider 505 may comprise two pieces, each of the two pieces having semi-circular cutouts for the first through third slider pins 561-563 that match and/or mate with semi-circular cutouts in the other of the two pieces to form circular holes or cutouts. The two pieces may be attached to each other and/or the first through third slider pins 561-563 (e.g., by screwing, welding, soldering, brazing, solvent welding, gluing, etc.). In some embodiments, each of the first through third slider pins 561-563 may have a different diameter and/or length than one or both of the other of the first through third slider pins 561-563. In yet other embodiments, the latch/slider may comprise more or less than three slider pins.

The pivot shown in FIGS. 20-21 comprises first through fifth surfaces 505a-505e. In some embodiments, the first surface 505a may be angled at approximately 45 degrees relative to the second surface 505b, which is horizontal or substantially horizontal. The third surface 505c may be curved and have substantially the same (or a slightly larger) curvature than the second slider pins 562. The fourth surface 505d may be angled from 30 degrees to 60 degrees (e.g., 33 degrees, 40 degrees, 45 degrees, 55 degrees, etc.) from horizontal in the opposite direction from first surface 505a, and the fifth surface 505e may be curved and have substantially the same (or a slightly larger) curvature than the third slider pins 563. When the latch/slider 505 is moved away from the handle end of the chassis 509 (the unlocked position), (i) first slider pin 561 moves and/or rotates up until the first slider pin 561 is near and/or contacts the first surface 505a, (ii) the second slider pin 562 moves and/or slides along the second surface 505b until the second slider pin 562 is near and/or contacts the third surface 505c, and (iii) the third slider pin 563 moves and/or slides along and/or down the fourth surface 505d until the third slider pin 563 is near and/or contacts the fifth surface 505e. The curved surfaces 505c and 505e may be configured to stop the rotational and/or downward and/or forward movement of the latch/slider 505 beyond a predetermined angle and/or distance, thereby preventing the projection 504 from dropping too far below the surface of the chassis 509. The third surface 505c may have an angle of curvature from 30 degrees to 180 degrees (e.g., 45 degrees-135° degrees, 60 degrees-150 degrees, approximately 90 degrees, etc.) from horizontal. The fifth surface may 505e may also have an angle of curvature of from 30 degrees to 180 degrees) or any value or range of values therein) from horizontal in a direction opposite to the angle of curvature of the third surface 505c. The angle of curvature of the fifth surface 505e may be the same or different from the angle of curvature of the third surface 505c.

Similar to the module housing 300 shown in FIGS. 12-15, the pivots 508 and the chassis 509 may be formed and/or cast together as a single unitary piece or may be formed and/or cast separately. The chassis 509 and/or pivots 508 may comprise a non-ferrous metal (e.g., aluminum, zinc, magnesium, tin, alloys thereof and/or other suitable metal[s]) and/or one or more moldable, high stiffness plastics (e.g., epoxies, polycarbonates, etc.). Likewise, the handle 573 may comprise one or more of the same materials as the chassis 509 and may be rotatably attached to the chassis 509 (e.g., through the shafts or pins 550) and to the latch/slider 505 (e.g., through slider pins 561). The handle 573 may comprise the arms 574a, a grasping bar 574b and the upper bars 574c, each of which may be cast and/or formed separately from the same or different materials. Alternatively, the handle 573 may be formed and/or cast as single piece from the same material (e.g., from galvanized sheet metal).

Additionally, in some embodiments, the pivots 508 may have a different shape and/or cross-section than the pivot 508 of FIGS. 20-21. For example, in some embodiments, the pivot 508 may have a third curved surface similar to curved surface 505e on which pin 561 may rest when the latch/slider 505 is in the locked position (i.e., when the latch/slider 505 is closest to the handle end of the chassis 509 as in FIG. 20). In some embodiments, the length of surface 505b measured horizontally may be shorter or longer in relation to the length of latch/slider 505. Similarly, the length of surface 505d measured diagonally may also be shorter or longer relative to the overall height of the pivot 508. In some embodiments, the second slider pins 562 may be closer or farther apart from each other along the length of latch/slider 505 and the dimensions of the pivots 508 may be adjusted accordingly such that the second and third slider pins 562, 563 move and or slide along the surfaces 505b and 505d, respectively. In some embodiments, the pivot may comprise additional horizontal, vertical, curved and/or sloped surfaces and may have any lengths(s) and or other dimension(s) to facilitate placement and/or operation of the latch/slider 505.

An Exemplary Method of Manufacturing a Module Housing

The present invention further relates to method of manufacturing a module housing, the method comprising (i) operably connecting a slider to a latch or forming a slider as part of the same unitary body as the latch, wherein the slider is configured to move the latch relative to a chassis in the module housing, (ii) operably coupling the latch and/or the slider to a pivot in the chassis, the latch and/or the slider being configured to move on and/or around one or more pivots, and (iii) attaching a handle to the chassis and/or the slider, wherein the handle is configured to move from a first position to a second position such that the latch moves from a locked position to an unlocked position, or from the unlocked position to the locked position in response to movement of the slider and/or the handle.

In some embodiments, the method may further comprise molding and/or forming the chassis and the pivot(s), and fixedly attaching the pivot(s) to the chassis. In alternative embodiments, the pivot(s) and the chassis may be cast and/or formed together as part of the same unitary body. In addition, the slider and the latch may be cast and/or formed at the same time from the same material. In some embodiments, the method may comprise forming a bent plate in the module casing or housing, and optionally placing or connecting a spring between the bent plate and a projection or a surface on the latch at or near the end of the latch closest to the handle. In other embodiments, the method may also comprise attaching a spring between (i) the chassis, the module casing or the module housing, and (ii) the latch, the spring being configured to move the latch to a default position (e.g., the locked position in the absence of any force on the latch (e.g., toward the unlocked position). In some such embodiments, the latch may also comprise a spring extension, and the method may further comprise inserting the spring extension into the spring and/or operably placing or connecting the spring to the chassis and the latch, where the spring extension is configured to prevent misalignment of the spring and the latch.

In some implementations, the method may comprise forming and/or cutting one or more arcs or grooves in the latch, one of which may be configured to rest on and/or mate with the pivot. In some embodiments, the method may include forming a pressure bar and fixedly attaching the pressure bar to the slider. The pressure bar may be cast and/or formed at the same time as the slider and may be part of the same unitary body. In a further embodiment, the method may further comprise coating the slider, portions of the chassis, and/or one or more surfaces of the latch with one or more materials having a low coefficient of friction.

In some embodiments, the method may comprise forming a projection and fixedly attaching (e.g., by welding, soldering, brazing, pinning, etc.) the projection to the latch. In such embodiments, the projection may be cast and/or formed at the same time as the latch as part of the same unitary body. In further embodiments, the method may also comprise forming one or more additional projections (as part of the latch or formed separately and fixedly attached to the latch by one or more of the methods described above), the one or more additional projections configured to guide and or control the movement of the latch within the chassis and/or module housing.

In some instances, the method comprises assembling the handle by operably attaching arms to a shaft and a grasping bar, prior to attaching the handle to the chassis and/or the slider. The arms, the shaft and/or the grasping bar may be formed from the same materials or from different materials. In other embodiments, the arms, the shaft, and/or the grasping bar may be cast and/or formed at the same time from the same material.

In still further embodiments, the method may include forming a sliding chute in which the slider and the pressure bar move (e.g., parallel to another surface, such as the uppermost surface of the module housing). In such embodiments, the method may also comprise cutting or otherwise creating (e.g., by molding) an elongated slot in the slider, through which the latch may protrude. Also in such embodiments, the method may also comprise forming first and second blocks in or on the chassis and/or module housing, and attaching lugs on opposing sides of the slider 205, the lugs configured to be in contact with and/or engage the first and/or second blocks to control and/or confine the movement of the latch and/or the slider. In yet other embodiments, the method may comprise attaching the pressure bar to or forming the pressure bar on and/or at an end of the elongated slot to be positioned closest to the electrical interface.

In some implementations, the method may comprise forming one or more teeth on or attaching one or more teeth to the shaft, and forming one or more slots in the slider, the teeth configured to mesh and/or mate with the slots in the slider such that when the handle moves from the first position to the second position, the latch moves from the locked position to the unlocked position. In such embodiments, the method may also comprise forming a pressure bar and fixedly attaching the pressure bar to the slider, the pressure bar configured such that a corresponding surface of the latch slides along the surface of the pressure bar, thereby moving the latch from one position to the other. In some embodiments, the pressure bar may be cast or formed with the slider as a single unitary body. In still other embodiments, the method may include forming a cutout in the slider configured to allow a first projection on the latch to move up and/or above a top surface of the slider when the latch and the first projection are in a locked position.

In other embodiments, the method further comprises fixedly attaching first through third slider pins to the latch and/or the slider prior to connecting the latch and/or the slider to the pivot(s). In some embodiments, the method may further comprise assembling the handle by operably attaching arms to upper bars and a grasping bar prior to attaching the handle to the chassis and/or to the latch and/or the slider.

An Exemplary Method of Locking a Module in a Corresponding Socket

In another aspect, the present invention provides a method of locking a module into a corresponding socket configured to accept such module, the method generally comprising (i) moving a handle from a first position to a second position such that a slider operably connected to the handle and a latch operably connected to or formed as part of the same unitary body as the slider move from a locked position to an unlocked position, wherein the latch is configured to move on and/or around a pivot, (ii) inserting the module into the socket until the latch is in the socket; and (iii) moving the handle from the second position to the first position such that the latch moves from the unlocked position to the locked position. In some embodiments (e.g., when the module housing comprises a spring, configured to provide a force on the latch to cause the latch to be in the locked position), removing a force on the latch holding the handle toward the unlocked position moves the latch to the locked position.

In further embodiments, the method may further comprise removing the module from the socket by moving the handle from the first position to the second position such that the slider and the latch move from the locked position to the unlocked position, and pulling on the handle and/or the module until the module is removed from the socket. In some embodiments, the first position of the handle may be generally parallel to a planar surface of the slider, where the handle in the first position is located at or adjacent to the optical interface end of the module housing. In such embodiments, the second position of the handle may also be generally parallel to the planar surface of the slider, but where the handle is located farther away from the optical interface end of the module housing than when the handle is in the first position. In other embodiments, the first position of the handle may be a "lowered" position, and the second position may be a "raised" position, wherein the handle in the raised position is rotated 90 degrees from the handle in the lowered position.

In some implementations, the slider is fixedly connected to the handle. In other embodiments the slider is operably connected to the handle by a rotatable shaft with two or more teeth and the slider comprises two or more (e.g., a matching number) of slots such that moving the handle from the lowered position to the raised position meshes and/or mates one or more of the teeth with one or more corresponding slot(s) and pulls the slider closer to and/or under the handle, thereby moving or rotating the latch from the locked position to the unlocked position. In such embodiments, moving the handle from the raised position to the lowered position meshes and/or mates at least one other tooth with at least one other corresponding slot and pushes the slider away from and/or out from under the handle, thereby moving or allowing the latch to move or rotate from the unlocked position to the locked position.

In some embodiments (e.g., when there is an intermediate gear or similar mechanism between the teeth and the slots), moving the handle from the lowered position to the raised position moves the slider away from and/or out from under the handle, thereby moving the slider and the latch from the locked position to the unlocked position.

In one embodiment, raising the handle pulls a pressure bar along a surface of the latch and moves the latch from the locked position to the unlocked position. Also in this embodiment, lowering the handle pushes or moves the pressure bar in the opposite direction, allowing the latch to move from the unlocked position to the locked position.

In some embodiments (e.g., when the upper bars of the handle are attached to the latch/slider by slider pins, and the arms of the handle are attached to the chassis by shafts or pins offset from the slider pins), moving the handle from the lowered position to the raised position, moves or rotates the upper bars down and/or into the chassis, and moves the projection end of the latch/slider forward and/or down into chassis (i.e., the unlocked position). In such embodiments, moving the handle from the raised position to the lowered position, moves or rotates the upper bars up and/or out of the chassis, and moves the projection end of the latch/slider back and/or out of the chassis (i.e., the locked position).

CONCLUSION/SUMMARY

Thus, the present invention advantageously provides latchable module housings in which the latch and/or the slider rotates on and/or around a pivot, thereby providing module housings that are easily seated and securely locked in and removed from a module socket with minimal force and/or damage to the latch, the module, the socket and/or the device to which the module is connected. Embodiments of the present latchable module housings also advantageously provide positive engagement of the handle with the slider (e.g., when the handle and the slider are fixedly attached to one another or when the handle comprises one or more teeth and the slider comprises one or more slots that mesh with and/or mate with the one or more teeth) or a unitary latch/slider, thereby increasing the likelihood of proper deployment of the latch and/or the slider when the module housing is locked in or removed from a module socket. The present invention also provides methods of making and using such latchable module housings.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A module housing, comprising:
a) a chassis;
b) one or more pivots attached to the chassis;
c) a latch configured to secure the chassis and/or the housing in a complementary and/or corresponding slot when in a locked position, the latch being configured to move on and/or around the pivot(s) and having a tapered end that protrudes from the module housing when in the locked position;
d) a slider in contact with and/or connected to the latch and configured to move the latch relative to the chassis, the slider having a pressure bar that contacts the tapered end of the latch;
e) a handle configured to be in contact with and/or connected to the slider such that when the handle moves from a first position to a second position, the pressure bar applies pressure to the tapered end of the latch and moves the tapered end of the latch down and/or into the module housing, and the slider and the latch move from the locked position to an unlocked position; and f) an elastic reset device configured to move the latch from the unlocked position to the locked position in an absence of a force on the latch towards the unlocked position.

2. The module housing of claim 1, further comprising a projection on the tapered end of the latch, wherein the projection protrudes from the module housing when the latch is in the locked position.

3. The module housing of claim 1, wherein the module comprises an optical transceiver.

4. The module housing of claim 1, wherein the pressure bar is attached to or part of a same unitary body as the slider.

5. The module housing of claim 1, wherein the pivot(s) and the chassis are fixedly attached to one another or are each part of a same unitary body.

6. The module housing of claim 1, wherein the handle is rotatably attached to the chassis and comprises a shaft, two arms and a grasping bar.

7. The module housing of claim 1, wherein the handle is further configured to retract the slider such that the latch moves from the locked position to the unlocked position when the handle moves from the first position to the second position.

8. The module housing of claim 1, wherein the handle is further configured to pull the slider forward such that the latch moves from the locked position to the unlocked position.

9. A method of manufacturing a module housing, the method comprising:
  a) operably connecting a slider to a latch, wherein the slider is configured to move the latch relative to a chassis in the module housing, the latch has a tapered end that protrudes from the module housing when in a locked position, and the slider has a pressure bar that contacts the tapered end of the latch;
  b) operably coupling the latch to one or more pivots in the chassis, the latch being configured to move on and/or around the pivot(s);
  c) attaching an elastic reset device to the chassis, the elastic reset device being configured to move the latch to the locked position in an absence of a force on the latch toward the locked position; and
  d) attaching a handle to the slider, such that when the handle moves from a first position to a second position, the pressure bar applies pressure to the tapered end of the latch and moves the tapered end of the latch down and/or into the module housing, and the latch moves from a locked position to an unlocked position in response to movement of the slider and the handle.

10. The method of claim 9, further comprising fixedly attaching or forming as part of a same unitary body the pivot(s) and the chassis.

11. The method of claim 9, further comprising fixedly attaching or forming as part of the same unitary body the slider and the pressure bar.

12. The method of claim 9, further comprising assembling the handle by operably attaching arms to a shaft and a grasping bar prior to attaching the handle to the chassis.

13. The method of claim 9, further comprising fixedly attaching the handle and the slider such that the slider and handle move translationally relative to the chassis.

14. The method of claim 9, further comprising assembling the handle by operably attaching arms to upper bars and a grasping bar prior to attaching the handle to the chassis and/or to the slider.

15. The method of claim 9, wherein the latch further comprises a projection, and the projection protrudes from the module housing when in the locked position.

16. The method of claim 15, further comprising fixedly attaching or forming as part of the same unitary body the latch, the tapered end, and the projection.

17. A module housing, comprising:
  a) a chassis;
  b) one or more pivots attached to the chassis;
  c) a latch configured to secure the chassis and/or the housing in a complementary and/or corresponding slot when in a locked position;
  d) a slider configured to be in contact with and/or connected to the latch and to move the latch relative to the chassis, the latch and/or the slider being configured to move on and/or around the pivot(s); and
  e) a handle configured to be in contact with and/or connected to the slider such that when the handle moves from a first position to a second position, the slider and the latch move to the locked position and/or an unlocked position, wherein the handle comprises one or more teeth, and the slider comprises one or more slots, the one or more teeth configured to mesh and/or mate with the one or more slots such that the latch and the slider move to the unlocked position and/or the locked position when the handle moves from the first position to the second position.

18. The module housing of claim 17, wherein the handle comprises two teeth and the slider comprises two slots, wherein the two teeth and two slots are configured such that (i) one of the two teeth meshes and/or mates with one of the two slots when the handle moves from the first position to the second position so as to move the latch from the locked position to the unlocked position, and (ii) the other one of the two teeth meshes and/or mates with the other one of the two slots when the handle moves from the second position to the first position so as to move the latch from the unlocked position to the locked position.

19. The module housing of claim 17, wherein the handle is further configured to retract the slider such that the latch moves from the locked position to the unlocked position when the handle moves from the first position to the second position.

20. The module housing of claim 17, further comprising a projection on the latch, wherein the projection protrudes from the module housing when the latch is in the locked position.

21. The module housing of claim 20, further comprising a pressure bar attached to or part of a same unitary body as the slider, wherein when the handle moves from the first position to the second position, the pressure bar applies pressure to the latch and moves an end of the latch down and the projection into the module housing.

22. The module housing of claim 17, wherein the handle is rotatably attached to the chassis and comprises a shaft, two arms and a grasping bar.

23. A method of manufacturing a module housing, the method comprising:
  a) operably connecting a slider to a latch or forming a slider as part of a same unitary body as the latch, wherein the slider is configured to move the latch relative to a chassis in the module housing;
  b) operably coupling the latch and/or the slider to one or more pivots in the chassis, the latch and/or the slider being configured to move on and/or around the pivot(s);
  c) forming one or more teeth on a shaft and forming one or more slots in the slider, the one or more teeth configured to mesh and/or mate with the one or more slots in the slider;
  d) assembling a handle by operably attaching arms to the shaft and a grasping bar; and e) after assembling the handle, attaching the handle to the chassis and/or the slider, wherein when the handle moves from a first position to a second position, the latch moves from a locked position to an unlocked position.

24. The method of claim 23, wherein first and second teeth are formed on the shaft, first and second slots are formed in the slider, the first tooth meshes and/or mates with the first slot when the handle moves from the first position to the second position so as to move the latch from the locked position to the unlocked position, and the second tooth meshes and/or mates with the second slot when the handle moves from the second position to the first position so as to move the latch from the unlocked position to the locked position.

25. The method of claim 23, further comprising fixedly attaching or forming a pressure bar on the slider, and forming a projection on the latch, wherein the projection protrudes from the module housing when the latch is in the locked position, and when the handle moves from the first position to the second position, the pressure bar applies pressure to the latch and moves an end of the latch down and the projection into the module housing.

26. The method of claim 23, further comprising attaching an elastic reset device to the chassis, the elastic reset device being configured to move the latch to the locked position in an absence of a force on the latch toward the locked position.

* * * * *